(12) United States Patent
Geen et al.

(10) Patent No.: US 7,421,897 B2
(45) Date of Patent: Sep. 9, 2008

(54) CROSS-QUAD AND VERTICALLY COUPLED INERTIAL SENSORS

(75) Inventors: John A. Geen, Tewksbury, MA (US); Jinbo Kuang, Acton, MA (US)

(73) Assignee: Analog Devices, Inc., Norwood, MA (US)

( * ) Notice: Subject to any disclaimer, the term of this patent is extended or adjusted under 35 U.S.C. 154(b) by 151 days.

(21) Appl. No.: 11/106,053

(22) Filed: Apr. 14, 2005

(65) Prior Publication Data

US 2006/0230830 A1     Oct. 19, 2006

(51) Int. Cl.
*G01P 9/04* (2006.01)
(52) U.S. Cl. .................. 73/504.12; 73/504.14
(58) Field of Classification Search ........... 73/504.02, 73/504.04, 504.12, 504.14, 504.16, 514.32, 73/514.38, 514.36, 514.16, 514.29
See application file for complete search history.

(56) References Cited

U.S. PATENT DOCUMENTS

| | | | |
|---|---|---|---|
| 2,309,853 A | 2/1943 | Lyman et al. | |
| 4,381,672 A | 5/1983 | O'Connor et al. | 73/505 |
| 4,510,802 A | 4/1985 | Peters | 73/505 |
| 4,524,619 A | 6/1985 | Staudte | 73/505 |
| 4,598,585 A | 7/1986 | Boxenhorn | 73/505 |
| 4,654,663 A | 3/1987 | Alsenz et al. | 73/517 |
| 4,744,248 A | 5/1988 | Stewart | 73/505 |
| 4,744,249 A | 5/1988 | Stewart | 73/505 |
| 4,884,446 A | 12/1989 | Ljung | 73/505 |
| 5,016,072 A | 5/1991 | Greiff | 357/26 |
| 5,016,076 A | 5/1991 | Darwish | 357/38 |
| 5,025,346 A | 6/1991 | Tang et al. | 361/283 |
| 5,056,366 A | 10/1991 | Fersht et al. | 73/505 |
| 5,111,693 A | 5/1992 | Greiff | 73/514 |
| 5,144,184 A | 9/1992 | Greiff | 310/312 |
| 5,195,371 A | 3/1993 | Greiff | 73/505 |
| 5,203,208 A | 4/1993 | Bernstein | 73/505 |
| 5,216,490 A | 6/1993 | Greiff et al. | 73/517 |
| 5,241,861 A | 9/1993 | Hulsing, II | 73/505 |
| 5,259,247 A | 11/1993 | Bantien | 73/718 |

(Continued)

FOREIGN PATENT DOCUMENTS

WO     WO 93/05401     3/1993

(Continued)

OTHER PUBLICATIONS

Authorized Officer E. de la Rosa Rivera, *International Search Report and the Written Opinion of the International Searching Authority*, PCT/US2006/012963, Aug. 16, 2006, 12 pages.

(Continued)

*Primary Examiner*—Helen C. Kwok
(74) *Attorney, Agent, or Firm*—Bromberg & Sunstein LLP

(57) ABSTRACT

An inertial sensor includes a cross-quad configuration of four interconnected sensor elements. Each sensor element has a frame and a resonator suspended within the frame. The sensor elements are arranged so that the frames of adjacent sensor elements are allowed to move in anti-phase to one another but are substantially prevented from moving in phase with one another. The sensor elements may be configured in a horizontally coupled arrangement, a vertically coupled arrangement, or a fully coupled arrangement. A pair of sensor elements may be vertically coupled.

26 Claims, 18 Drawing Sheets

U.S. PATENT DOCUMENTS

| | | | | |
|---|---|---|---|---|
| 5,273,939 | A | 12/1993 | Becker et al. | 437/209 |
| 5,313,835 | A | 5/1994 | Dunn | 73/505 |
| 5,329,815 | A | 7/1994 | Dunn et al. | 73/505 |
| 5,341,682 | A | 8/1994 | Hulsing, II | 73/505 |
| 5,343,749 | A | 9/1994 | Macy | 73/505 |
| 5,349,855 | A | 9/1994 | Bernstein et al. | 73/505 |
| 5,359,893 | A | 11/1994 | Dunn | 73/505 |
| 5,367,217 | A | 11/1994 | Norling | 310/370 |
| 5,377,544 | A | 1/1995 | Dunn | 73/505 |
| 5,392,650 | A | 2/1995 | O'Brien et al. | 73/517 |
| 5,408,877 | A | 4/1995 | Greiff et al. | 73/505 |
| 5,481,914 | A | 1/1996 | Ward | 73/504.16 |
| 5,492,596 | A | 2/1996 | Cho | 156/632.1 |
| 5,496,436 | A | 3/1996 | Bernstein et al. | 156/628.1 |
| 5,505,084 | A | 4/1996 | Greiff et al. | 73/504.14 |
| 5,511,419 | A | 4/1996 | Dunn | 73/504.08 |
| 5,515,724 | A | 5/1996 | Greiff et al. | 73/504.12 |
| 5,530,342 | A | 6/1996 | Murphy | 324/158.1 |
| 5,535,902 | A | 7/1996 | Greiff | 216/2 |
| 5,537,872 | A | 7/1996 | Frere et al. | 73/504.12 |
| 5,555,765 | A | 9/1996 | Greiff | 73/504.09 |
| 5,574,222 | A | 11/1996 | Offenberg | 73/514.32 |
| 5,581,035 | A | 12/1996 | Greiff | 73/514.32 |
| 5,600,064 | A | 2/1997 | Ward | 73/504.04 |
| 5,600,065 | A | 2/1997 | Kar et al. | 73/504.12 |
| 5,604,309 | A | 2/1997 | Ward | 73/504.02 |
| 5,604,312 | A | 2/1997 | Lutz | 73/504.14 |
| 5,608,351 | A | 3/1997 | Ward | 330/107 |
| 5,635,638 | A | 6/1997 | Geen | 73/504.04 |
| 5,635,639 | A | 6/1997 | Greiff et al. | 73/504.04 |
| 5,635,640 | A | 6/1997 | Geen | 73/504.12 |
| 5,646,348 | A | 7/1997 | Greiff et al. | 73/514.36 |
| 5,650,568 | A | 7/1997 | Greiff et al. | 73/504.09 |
| 5,672,949 | A | 9/1997 | Ward | 318/609 |
| 5,696,323 | A | 12/1997 | Hulsing, II | 73/504.12 |
| 5,717,140 | A | 2/1998 | Hulsing, II | 73/504.16 |
| 5,734,105 | A | 3/1998 | Mizukoshi | 73/504.02 |
| 5,747,961 | A | 5/1998 | Ward et al. | 318/646 |
| 5,763,781 | A | 6/1998 | Netzer | 73/504.16 |
| 5,767,405 | A | 6/1998 | Bernstein et al. | 73/504.16 |
| 5,783,973 | A | 7/1998 | Weinberg et al. | 331/35 |
| 5,795,988 | A | 8/1998 | Lo et al. | 73/1.77 |
| 5,796,001 | A | 8/1998 | Greiff et al. | 73/504.16 |
| 5,869,760 | A | 2/1999 | Geen | 73/504.12 |
| 5,886,816 | A | 3/1999 | Faris | 359/464 |
| 5,892,153 | A | 4/1999 | Weinberg et al. | 73/504.16 |
| 5,895,850 | A | 4/1999 | Buestgens | 73/504.12 |
| 5,895,851 | A | 4/1999 | Kano et al. | 73/504.04 |
| 5,911,156 | A | 6/1999 | Ward et al. | 73/504.16 |
| 5,918,280 | A | 6/1999 | Gang et al. | 73/504.12 |
| 5,920,012 | A | 7/1999 | Pinson | 73/504.12 |
| 5,945,600 | A | 8/1999 | Touge et al. | 73/504.14 |
| 5,952,572 | A | 9/1999 | Yamashita et al. | 73/504.04 |
| 5,955,668 | A | 9/1999 | Hsu et al. | 73/504.12 |
| 5,987,986 | A | 11/1999 | Wyse et al. | 73/504.12 |
| 5,992,233 | A | 11/1999 | Clark | 73/514.35 |
| 6,009,751 | A | 1/2000 | Ljung | 73/504.02 |
| 6,032,531 | A | 3/2000 | Roszhart | 73/504.04 |
| 6,044,707 | A | 4/2000 | Kato | 73/504.14 |
| 6,064,169 | A | 5/2000 | Ward et al. | 318/646 |
| 6,067,858 | A | 5/2000 | Clark et al. | 73/504.16 |
| 6,070,463 | A | 6/2000 | Moriya et al. | 73/504.12 |
| 6,070,464 | A | 6/2000 | Koury, Jr. et al. | 73/514.32 |
| 6,089,089 | A | 7/2000 | Hsu | 73/504.12 |
| 6,122,961 | A * | 9/2000 | Geen et al. | 73/504.12 |
| 6,128,953 | A | 10/2000 | Mizukoshi | 73/504.02 |
| 6,155,115 | A | 12/2000 | Ljung | 73/504.12 |
| 6,164,134 | A | 12/2000 | Cargille | 73/504.02 |
| 6,189,381 | B1 | 2/2001 | Huang et al. | 73/504.12 |
| 6,190,571 | B1 | 2/2001 | Kato | 216/2 |
| 6,230,563 | B1 | 5/2001 | Clark et al. | 73/504.04 |
| 6,250,156 | B1 | 6/2001 | Seshia et al. | 73/502.12 |
| 6,250,157 | B1 | 6/2001 | Touge | 73/504.12 |
| 6,257,059 | B1 | 7/2001 | Weinberg et al. | 73/504.16 |
| 6,282,960 | B1 | 9/2001 | Samuels et al. | 73/514.32 |
| 6,289,733 | B1 | 9/2001 | Challoner et al. | 73/504.12 |
| 6,311,555 | B1 | 11/2001 | McCall et al. | 73/488 |
| 6,321,598 | B1 | 11/2001 | Iwaki et al. | 73/504.02 |
| 6,505,511 | B1 | 1/2003 | Geen et al. | 73/504.12 |
| 6,516,666 | B1 | 2/2003 | Li | 73/504.12 |
| 6,561,029 | B2 | 5/2003 | Folkmer et al. | 73/504.14 |
| 6,742,389 | B2 * | 6/2004 | Nguyen et al. | 73/504.12 |
| 6,767,758 | B1 | 7/2004 | Geen | 438/48 |
| 6,848,304 | B2 * | 2/2005 | Geen | 73/504.04 |
| 6,860,151 | B2 | 3/2005 | Flatt et al. | 73/504.16 |
| 7,036,372 | B2 * | 5/2006 | Chojnacki et al. | 73/504.12 |
| 2003/0005767 | A1 | 1/2003 | Hulsing, II | 73/514.02 |
| 2003/0131664 | A1 | 7/2003 | Mochida et al. | 73/504.12 |
| 2003/0131669 | A1 | 7/2003 | Osawa | 73/861.355 |
| 2003/0200806 | A1 | 10/2003 | Geen et al. | 73/504.14 |
| 2005/0066728 | A1 | 3/2005 | Chojnacki et al. | 73/514.16 |
| 2005/0072231 | A1 | 4/2005 | Chojnacki et al. | 73/504.14 |

FOREIGN PATENT DOCUMENTS

| | | |
|---|---|---|
| WO | WO 96/39615 | 12/1996 |
| WO | WO 01/79862 A1 | 10/2001 |
| WO | WO 2005/103620 | 11/2005 |

OTHER PUBLICATIONS

Tom C. Wang and Joyce Ho, TSAR & TSAI Law Firm, Taiwan, Correspondence regarding office action from Taiwan Intellectual Property Office, May 11, 2007, 3 pages.

Weinberg et al., *A Micromachined Comb-Drive Tuning Fork Rate Gyroscope*, Proceedings of the 49th Annual Meeting of the Institute of Navigation, Jun. 21-23, 1993, 7 pages.

Seshia et al., *Integrated Microelectromechanical Resonant Output Gyroscope*, updated, online <http://hera.berkeley.edu/IRO/Summary/o1abstracts/ aseshia.1.html>, printed Feb. 6, 2002, 2 pages.

Green et al., *Single-Chip Surface Micromachined Integrated Gyroscope with 50°/h Allan Deviation*, IEEE Journal of Solid-State Circuits, vol. 37, No. 12, Dec. 2002, 7 pages.

*A Comb-drive Piezoresistive Vibratory Gyroscope*, online <http://mems.stanford.edu/~lian/gyro.html>, printed Feb. 6, 2002, 4 pages.

* cited by examiner

CROSS-QUAD AND VERTICALLY COUPLED INERTIAL SENSORS

CROSS-REFERENCE TO RELATED APPLICATION

The present invention is related to U.S. Provisional Patent Application No. 60/561,931 entitled Inertial Sensor Array and Coupling apparatus for the Same, filed on Apr. 14, 2004 in the names of John A. Geen, William A. Clark, and Jinbo Kuang, which is hereby incorporated herein by reference in its entirety.

FIELD OF THE INVENTION

The invention generally relates to sensors and, more particularly, the invention relates to inertial sensors.

BACKGROUND OF THE INVENTION

Inertial sensors, such as MEMS gyroscopes, often are adversely affected by rotational vibration noise at the drive frequency (often referred to as "wobble"). In particular, MEMS gyroscopes can produce false readings if they are not capable of distinguishing between rotational vibration and the actual movement they are intended to detect.

Also, distortion of the geometry of a MEMS device having an oscillating mass, such as a gyroscope, can produce an imbalance in the forces transverse to a longitudinal drive finger. This imbalance can cause a net force that is indistinguishable from a Coriolis force. Consequently, a gyroscope can produce false outputs. There are at least two sources of these geometric distortions. One arises from surface shear of the substrate (e.g., from release/wafer curvature on dicing). Another arises from differential expansion of the package and applied accelerations (e.g., diagonally, G×G). Some causes of G×G error is discussed in Geen, J. A., "Progress in Integrated Gyroscopes," IEEE PLANS 2004 Proceedings, pp. 1-6, which is hereby incorporated herein by reference in its entirety.

SUMMARY OF THE INVENTION

Certain embodiments of the present invention provide an inertial sensor having a cross-quad configuration of four sensor elements. Each sensor element has a frame and a movable mass suspended within the frame. At least two pairs of adjacent frames are interconnected by couplings that allow the frames to move in anti-phase to one another but substantially prevent the frames from moving in phase with one another. The four sensor elements can be configured in a horizontally coupled arrangement, a vertically coupled arrangement, or a fully coupled (i.e., horizontally and vertically coupled) arrangement. Certain other embodiments of the invention provide an inertial sensor having a pair of vertically coupled sensor elements.

In accordance with one aspect of the invention there is provided an inertial sensor having at least one substrate and four sensor elements arranged in a cross-quad configuration substantially in a plane above the at least one substrate. The four gyroscopes include a first sensor element having a first resonator suspended within a first frame; a second sensor element having a second resonator suspended within a second frame; a third sensor element having a third resonator suspended within a third frame; and a fourth sensor element having a fourth resonator suspended within a fourth frame. The first and third frames are coupled to move co-linearly along a first axis in the plane. The second and fourth frames are coupled to move co-linearly along a second axis in the plane parallel to the first axis. The frames of at least two pair of adjacent sensor elements are interconnected by couplings that enable anti-phase movements of the frames but substantially prevent in-phase movements of the frames.

In a typical embodiment, the first and second resonators are caused to move co-linearly and in anti-phase to one another along a third axis normal to the first and second axes in the plane, the third and fourth resonators are caused to move co-linearly and in anti-phase to one another along a fourth axis parallel to the third axis in the plane, the first and third resonators are caused to move in anti-phase to one another, and the second and fourth resonators are caused to move in anti-phase to one another.

In such a configuration, rotation of the substrate about an axis normal to the plane causes the movements of the frames. Specifically, rotation of the substrate in a first direction causes the first and third frames to move toward one another and the second and fourth frames to move away from one another while the first and second masses move toward each other, whereas rotation of the substrate in a second direction causes the first and third frames to move away from one anther and the second and fourth frames to move toward one another while the first and second masses move toward each other.

In certain embodiments, the first and second frames are interconnected by a first horizontal coupling that enables anti-phase movements of the frames along their respective axes but substantially prevents in-phase movements of the frames, while the third and fourth frames are interconnected by a second horizontal coupling that enables anti-phase movements of the frames along their respective axes but substantially prevents in-phase movements of the frames.

Each of the first and second horizontal couplings may include at least one bar coupled between the frames, the at least one bar supported by structures anchored to the at least one substrate. The structures allow the at least one bar to rotate at a pivot point when the frames move in anti-phase to one another but substantially prevent in-phase movements of the frames.

In one exemplary embodiment, each of the first and second horizontal couplings includes a first pair of short flexures extending from one of the frames and interconnected by a first long flexure, a second pair of short flexures extending from the other of the frames and interconnected by a second long flexure, a bar coupling the first long flexure to the second long flexure substantially at the midpoints of the first and second long flexures, and an anchor flexure supporting the bar. The anchor flexure intersects with the bar substantially at the midpoints of the bar and the anchor flexure. Each end of the anchor flexure anchored to the substrate.

In another exemplary embodiment, each of the first and second horizontal couplings includes a first flexure extending from one of the frames, a second flexure extending from the other of the frames, a bar coupled between the first and second flexures, and at least one anchor flexure supporting the bar. Each anchor flexure includes a structure anchored at one end to the at least one substrate and folded back 180 degrees to meet with the bar.

In certain other embodiments, the first and third frames are interconnected by a first vertical coupling that enables anti-phase movements of the frames along their respective axes but substantially prevents in-phase movements of the frames, while the second and fourth frames are interconnected by a second vertical coupling that enables anti-phase movements of the frames along their respective axes but substantially prevents in-phase movements of the frames.

Each of the first and second vertical couplings may include a first pair of interconnected levers coupled to one of the frames, the first pair of levers including a first lever and a second lever; a second pair of interconnected levers coupled to the other of the frames, the second pair of levers including a third lever and a fourth lever; a plurality of lever support structures allowing the levers to pivot as the frames move in anti-phase to one another; a first coupling flexure interconnecting the first lever and the third lever substantially between their respective pivot points; and a second coupling flexure interconnecting the second lever and the fourth lever substantially between their respective pivot points. The coupling flexures substantially prevent in-phase movements of the frames. Both ends of each coupling flexure typically move transversely to the movements of the frames in the same direction by substantially the same amount during anti-phase movements of the frames but are urged to move in opposite directions during in-phase movements of the frames.

The plurality of lever support structures typically include at least one pivot flexure coupled at one end to a lever and at another end to a structure anchored to the substrate. The at least one pivot flexure may include a first pivot flexure and a second pivot flexure interconnected at a point. The interconnection point of the pivot flexures may be toward a middle of the lever or toward an edge of the lever nearest the frame. The first coupling flexure is preferably substantially in line with the interconnection points of the first and third levers and the second coupling flexure is preferably substantially in line with the interconnection points of the second and fourth levers. The structure anchored to the substrate is typically a bar anchored to the substrate. Each pair of levers is typically interconnected by a lever flexure. Each lever is typically connected to its respective frame by a suspension flexure.

In order to detect movements of the frames, each frame may include finger structures that interdigitate with fixed sensing fingers anchored to the substrate for electrostatically sensing the movements of the frames. In order to move the masses, each mass may include finger structures that interdigitate with fixed drive fingers anchored to the substrate for electrostatically moving the masses.

In certain other embodiments, the first and second frames are interconnected by a first horizontal coupling, the third and fourth frames are interconnected by a second horizontal coupling, the first and third frames are interconnected by a first vertical coupling, and the second and fourth frames are interconnected by a second vertical coupling.

In accordance with another aspect of the invention there is provided an inertial sensor having at least one substrate and four sensor elements arranged in a cross-quad configuration substantially in a plane above the at least one substrate. The four sensor elements include a first sensor element having a first resonator suspended within a first frame, a second sensor element having a second resonator suspended within a second frame, a third sensor element having a third resonator suspended within a third frame, and a fourth sensor element having a fourth resonator suspended within a fourth frame. The first and third frames are coupled to move co-linearly along a first axis in the plane. The second and fourth frames are coupled to move co-linearly along a second axis in the plane parallel to the first axis. The inertial sensor also includes means for interconnecting the frames of a first pair of adjacent sensor elements to enable anti-phase movements of the frames but substantially prevent in-phase movements of the frames. The inertial sensor also includes means for interconnecting the frames of a second pair of adjacent sensor elements to enable anti-phase movements of the frames but substantially prevent in-phase movements of the frames.

The inertial sensor may also include third means for interconnecting the frames of a third pair of adjacent sensor elements to enable anti-phase movements of the frames but substantially prevent in-phase movements of the frames and fourth means for interconnecting the frames of a fourth pair of adjacent sensor elements to enable anti-phase movements of the frames but substantially prevent in-phase movements of the frames.

In accordance with another aspect of the invention there is provided an inertial sensor having at least one substrate; a pair of sensor elements substantially in a plane above the at least one substrate, each sensor element having a resonator suspended within a frame, the frames configured to move co-linearly along an axis in the plane; and a vertical coupling, interconnecting the frames, that enables anti-phase movements of the frames along their co-linear axis but substantially prevents in-phase movements of the frames.

The vertical coupling may include a first pair of interconnected levers coupled to one of the frames, the first pair of levers including a first lever and a second lever; a second pair of interconnected levers coupled to the other of the frames, the second pair of levers including a third lever and a fourth lever; a plurality of lever support structures allowing the levers to pivot as the frames move in anti-phase to one another; a first coupling flexure interconnecting the first lever and the third lever substantially at their respective pivot points; and a second coupling flexure interconnecting the second lever and the fourth lever substantially at their respective pivot points. The coupling flexures substantially prevent in-phase movements of the frames.

BRIEF DESCRIPTION OF THE DRAWINGS

The foregoing and advantages of the invention will be appreciated more fully from the following further description thereof with reference to the accompanying drawings wherein.

The drawings are for illustrative purposes and may not be drawn to scale.

DETAILED DESCRIPTION OF A PREFERRED EMBODIMENT

In certain embodiments of the present invention, an inertial sensor includes four sensor elements that are arranged in a "cross-quad" configuration. In preferred embodiments, the sensor elements are microelectromechanical systems (i.e., "MEMS") gyroscopes. The sensor elements together combine to effectively perform the function of a single gyroscope. The sensor elements are typically suspended above one or more underlying substrates (not shown) and are secured at various points to the substrate(s). Desirability of using a cross-quad arrangement of gyroscopes is discussed in U.S. Pat. No. 6,122,961, the disclosure of which is incorporated herein, in its entirety, by reference.

Each gyroscope has at least one resonator (mass) suspended within a frame. For the sake of discussion, the resonators of the inertial sensor gyroscopes are configured to move along two parallel X axes, while the frames of the inertial sensor gyroscopes are configured to move along two parallel Y axes normal to the X axes. Accordingly, rotation of the inertial sensor about the Z-axis causes each resonator to produce a Coriolis force that is imparted to its corresponding gyroscope frame. Upon receipt of this Coriolis force, the frame moves along the Y-axis. Capacitively coupled fingers on the frames and the substrate(s) detect these Y-axis movements, which are translated into a signal representing the magnitude of the angular acceleration. In embodiments of the invention, the frames of at least two pairs of adjacent gyroscopes are interconnected by couplings that allow for anti-phase movements of the frames but substantially prevent in-phase movements of the frames.

Figure 1A:
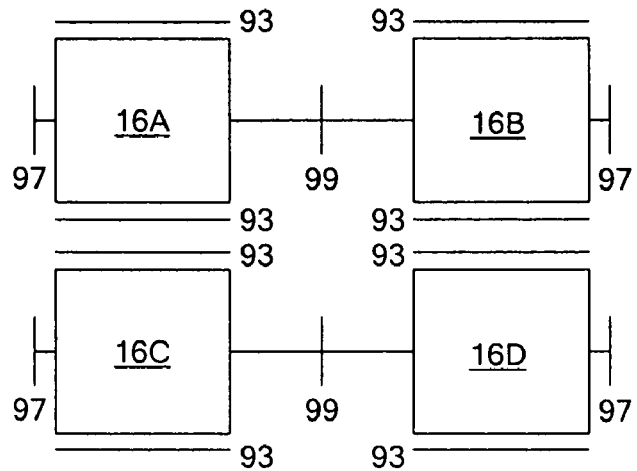
FIG. 1A shows a representation of four gyroscopes arranged in a horizontally coupled cross-quad configuration in accordance with illustrative embodiments of the present invention.

FIG. 1A shows a representation of four gyroscopes 16A-D arranged in a horizontally coupled cross-quad configuration in accordance with illustrative embodiments of the present invention. Here, the top pair of gyroscope frames and the bottom pair of gyroscope frames are interconnected by couplings 99 (referred to hereinafter as "horizontal" couplings) that allow anti-phase movements of the frames along separate parallel Y axes. Each gyroscope is preferably supported on the side opposite the horizontal coupling 99 by a balancer 97 that offsets certain effects of the horizontal coupling. Exemplary horizontal couplings 99 and balancers 97 are described below. Each gyroscope is preferably also supported on each of its remaining two sides by a suspension 93.

Figure 1B:
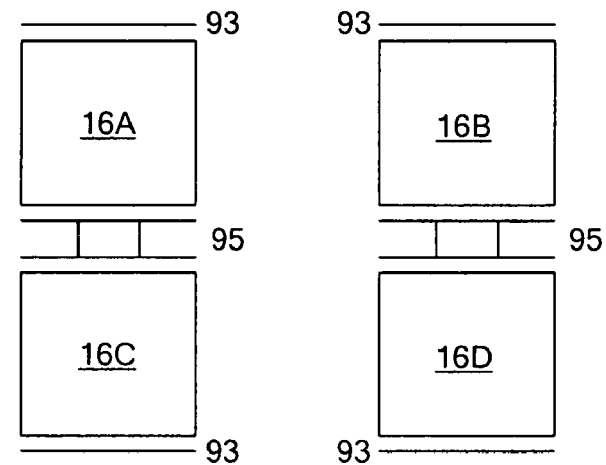
FIG. 1B shows a representation of four gyroscopes arranged in a vertically coupled cross-quad configuration in accordance with illustrative embodiments of the present invention.

FIG. 1B shows a representation of four gyroscopes 16A-D arranged in a vertically coupled cross-quad configuration in accordance with illustrative embodiments of the present invention. Here, the left side pair of gyroscope frames and the right side pair of gyroscope frames are interconnected by couplings 95 (referred to hereinafter as "vertical" couplings) that allow co-linear anti-phase movements of the frames along the Y axes. Exemplary vertical couplings 95 are described below. Each gyroscope is preferably supported on the side opposite the vertical coupling 95 by a suspension 93.

Figure 1C:
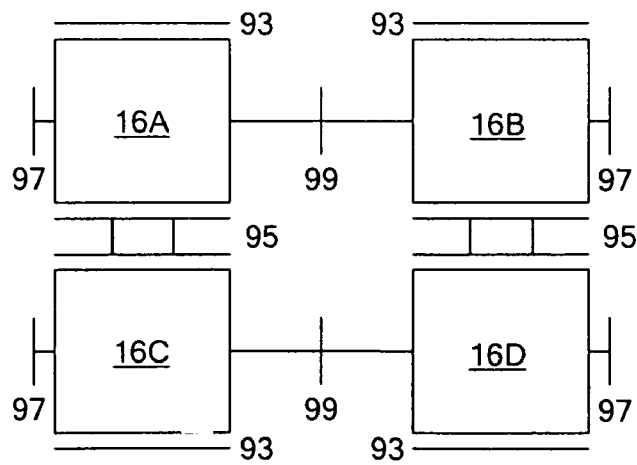
FIG. 1C shows a representation of four gyroscopes arranged in a vertically and horizontally coupled cross-quad configuration in accordance with illustrative embodiments of the present invention.

FIG. 1C shows a representation of four gyroscopes 16A-D arranged in a vertically and horizontally coupled cross-quad configuration in accordance with illustrative embodiments of the present invention. Here, the top pair of gyroscope frames and the bottom pair of gyroscope frames are interconnected by couplings 99 that allow anti-phase movements of the frames along separate parallel Y axes, while the left side pair of gyroscope frames and the right side pair of gyroscope frames are interconnected by couplings 95 that allow co-linear anti-phase movements of the frames. Each gyroscope is preferably supported on the side opposite the vertical coupling 95 by a suspension 93.

In illustrative embodiments, the gyroscopes 16A-16D are similar to those disclosed in U.S. Pat. Nos. 6,505,511 and 6,122,961, the disclosures of which are incorporated herein, in their entireties, by reference. The gyroscopes 16A-16D also may be similar to those disclosed in U.S. Pat. No. 6,877,374, the disclosure of which also is incorporated herein, in its entirety, by reference.

The gyroscopes 16A-16D are preferably configured and operated so as to have a common centroid. To this end, the resonators and frames of each diagonal pair of gyroscopes are typically operated in phase with one another, while the resonators and frames of any pair of adjacent gyroscopes are typically operated in anti-phase to one another. Accordingly, the following equation is generally true:

$$V1+V4=V2+V3,$$

where:

V1 is the vector distance of the first gyroscope 16A to a point of rotation,

V2 is the vector distance of the second gyroscope 16B to a point of rotation,

V3 is the vector distance of the third gyroscope 16C to a point of rotation, and V4 is the vector distance of the fourth gyroscope 16D to a point of rotation.

Note that a sign of the vector distance should be taken into account when considering this equation. When this relationship holds, the gyroscope as a whole becomes substantially insensitive to angular accelerations about that point of rotation to the extent that the responses of the frames match each other. The couplings overcome the mismatches induced by manufacturing tolerances and thereby improve the rejection of angular acceleration.

This arrangement nevertheless should not adversely affect the inertial sensor from detecting the underlying angular velocity for which it is designed.

Accordingly, embodiments of the invention should be substantially insensitive surface shear and also, as noted above, cause angular acceleration noise to cancel.

Figure 2:
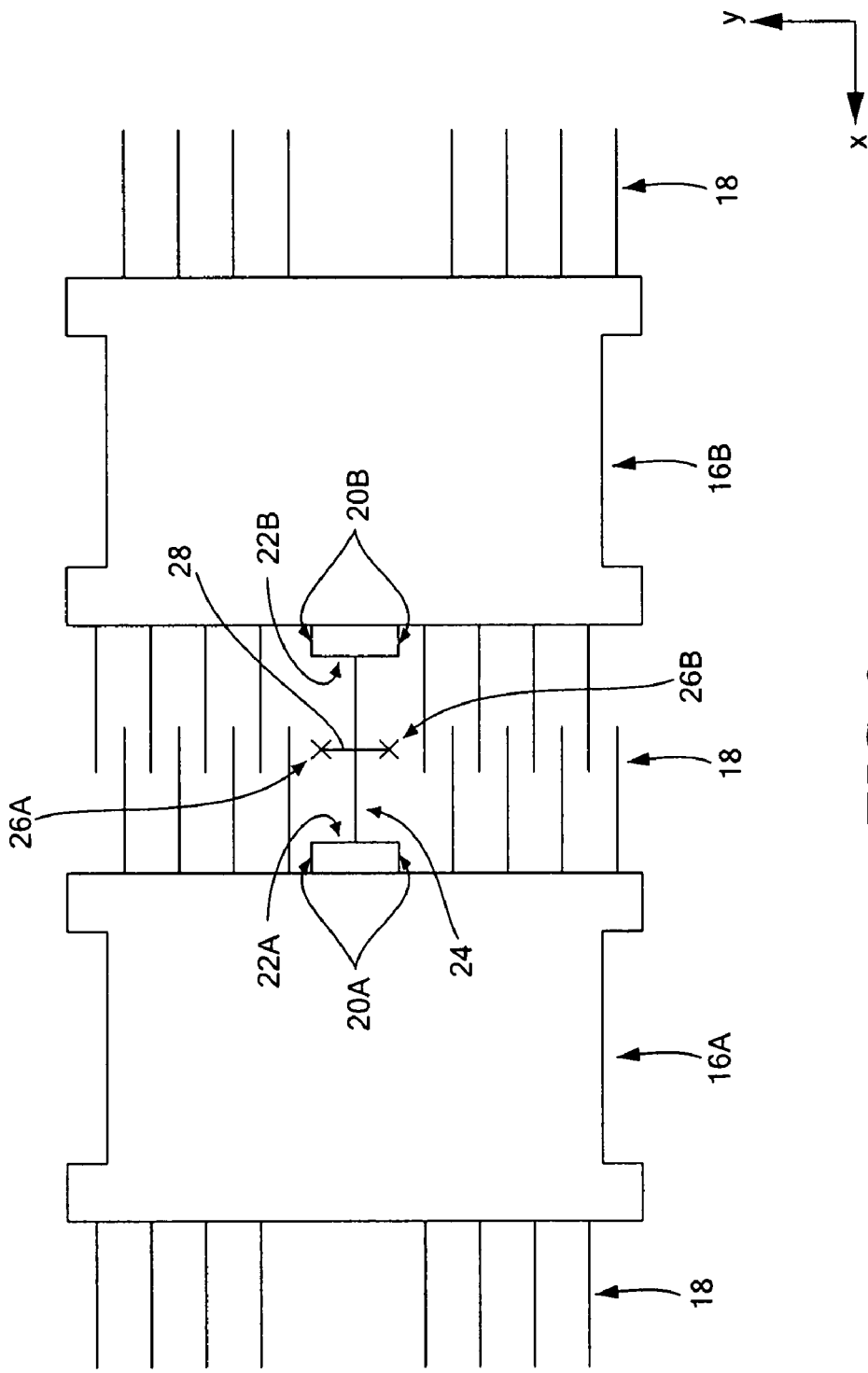
FIG. 2 schematically shows a first exemplary horizontal coupling apparatus for horizontally coupling two gyroscope frames in accordance with illustrative embodiments of the invention.

FIG. 2 schematically shows details of a first exemplary horizontal coupling apparatus 99 for horizontally interconnecting two gyroscope frames, such as the frames of gyroscopes 16A and 16B or the frames of gyroscopes 16C and 16D, in accordance with illustrative embodiments of the invention, such those shown in FIGS. 1A and 1C. For convenience, the frames of gyroscopes 16A and 16B are depicted. Specifically, the first frame 16A has a first pair of short flexures 20A that are coupled with a first long flexure 22A. In a corresponding manner, the second frame 16B has a second pair of short flexures 20B that are coupled with a second long flexure 22B. A bar 24 secures the first long flexure 22A to the second long flexure 22B. To provide some stability, a pair of anchors 26A and 26B extend on two sides of the bar 24 and couple with it by means of an anchor flexure 28.

This arrangement is substantially noncompliant when the two frames 16A and 16B are urged to move in phase. In contrast, this arrangement is substantially compliant when the two frames 16A and 16B are urged to move in anti-phase. In other words, when the first frame 16A is urged upwardly along the Y-axis, the second frame 16B is urged downwardly along the Y-axis. If both are urged upwardly along the Y-axis, however, this arrangement should be substantially non-compliant. In some embodiments, this arrangement permits the frames 16A and 16B to rotate to some extent as they move in the Y-direction.

Figure 3:
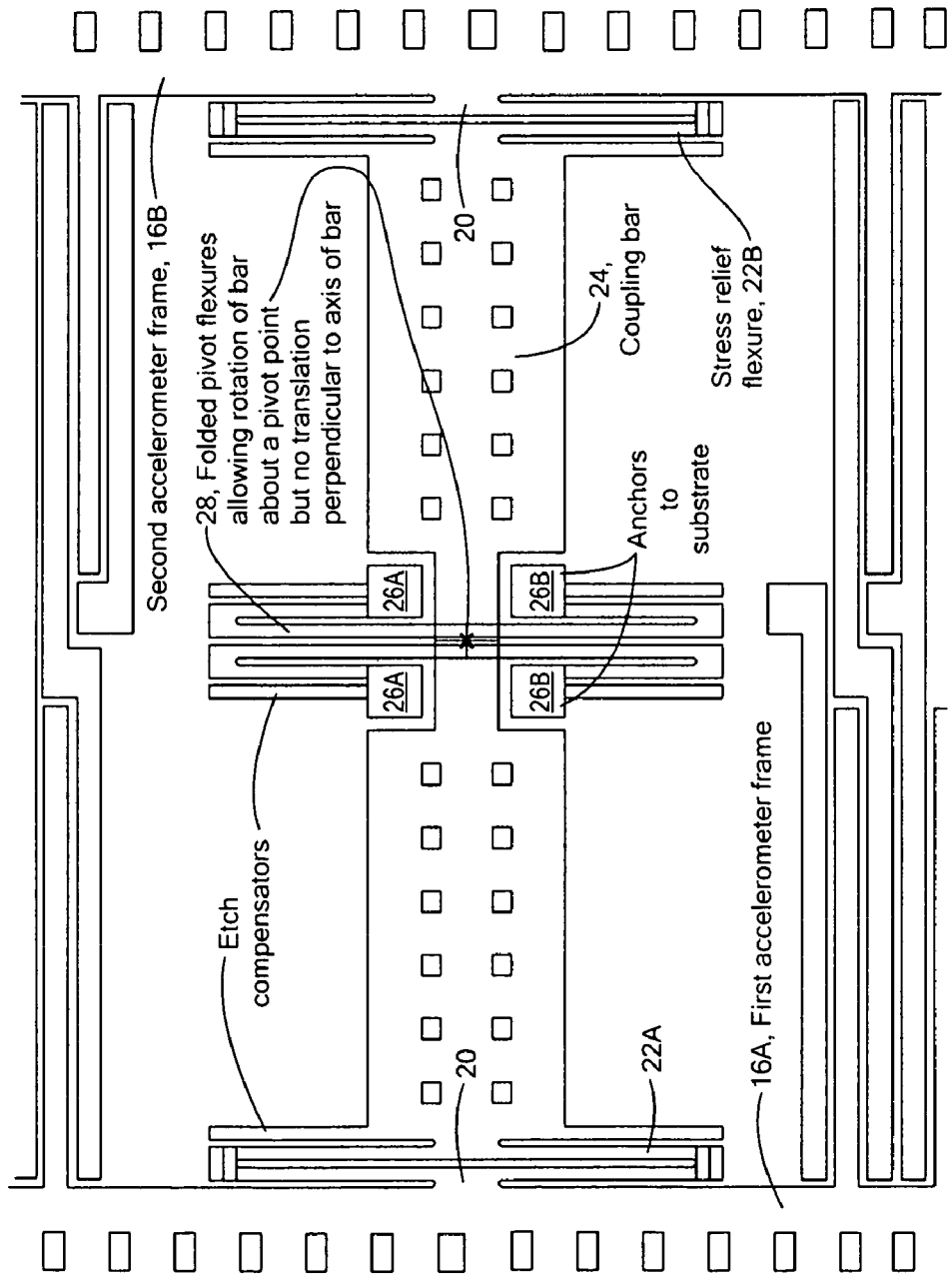
FIG. 3 schematically shows a second exemplary horizontal coupling apparatus for horizontally coupling two gyroscope frames in accordance with illustrative embodiments of the invention.

FIG. 3 schematically shows details of a second exemplary horizontal coupling apparatus 99 for horizontally interconnecting two gyroscope frames, such as the frames of gyroscopes 16A and 16B or the frames of gyroscopes 16C and 16D, in accordance with illustrative embodiments of the invention, such those shown in FIGS. 1A and 1C. Specifically, in this exemplary embodiment, the anchor flexure 28 actually extends outwardly and then folds back 180 degrees to meet with the bar 24. In addition, the coupling apparatus also has etch compensators. The folded anchor flexure 28 allows rotation of the bar 24 about a pivot point but substantially prevents translation perpendicular to the axis of the bar 24. Also, rather than have a pair of short flexures 20 on each frame, this embodiment uses a single short flexure 20 on each frame.

The horizontal coupling apparatus 99 effectively add mass and stiffness to the movements of the frames 16. Since each frame is only coupled to an adjacent frame along one of its sides, the coupling apparatus 99 effectively unbalances the movements of each frame. Therefore, the inertial sensor with horizontal couplings preferably includes a number of balancers 97 to help offset the effects of the horizontal coupling apparatus 99. Specifically, a balancer 97 is preferably coupled to a side of each gyroscope frame opposite the side with the horizontal coupling apparatus 99. The configuration of each balancer 97 is typically the equivalent of half of a horizontal coupling apparatus 99 and therefore imparts substantially an equal but opposite mechanical effect on its respective gyroscope frame.

Figure 4:
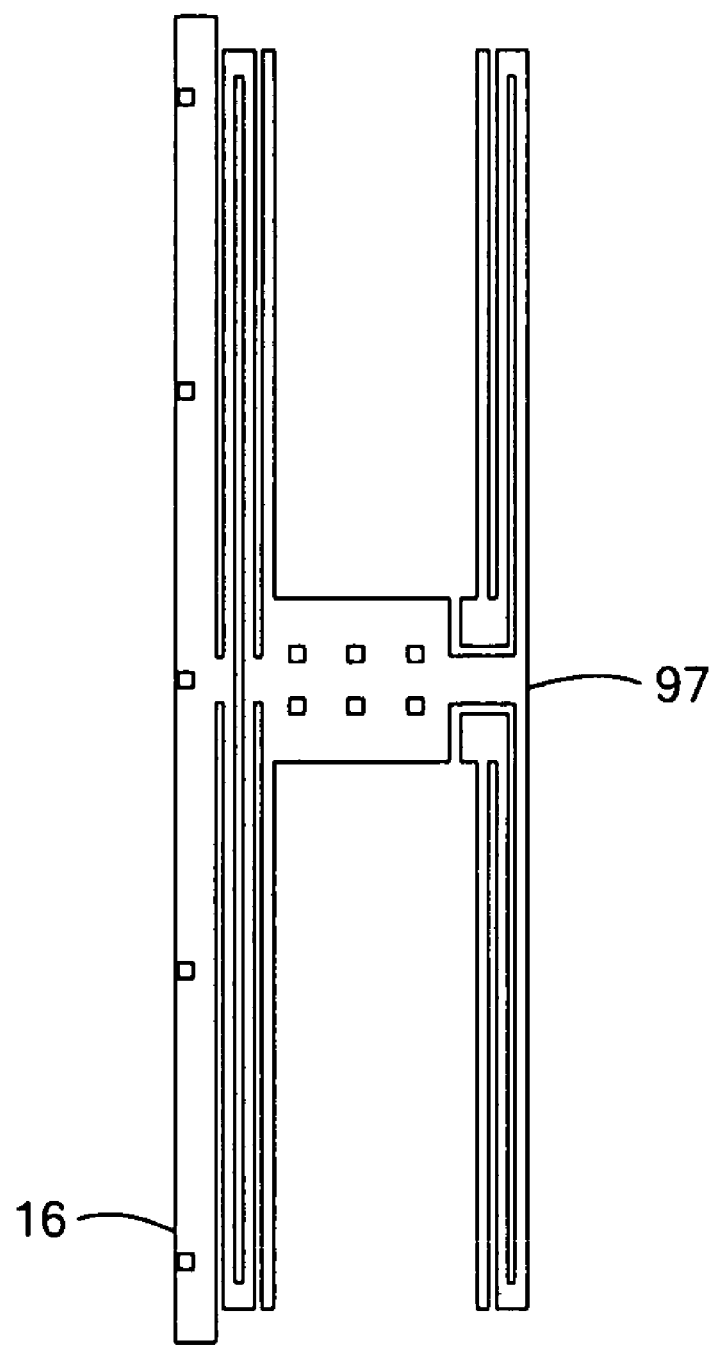
FIG. 4 schematically shows exemplary balancers in accordance with illustrative embodiments of the invention

FIG. 4 schematically shows details of an exemplary balancer 97 in accordance with illustrative embodiments of the invention. As shown, the configuration of each balancer 97 is essentially the equivalent of half of a coupling apparatus as shown in FIG. 3.

Figure 5:
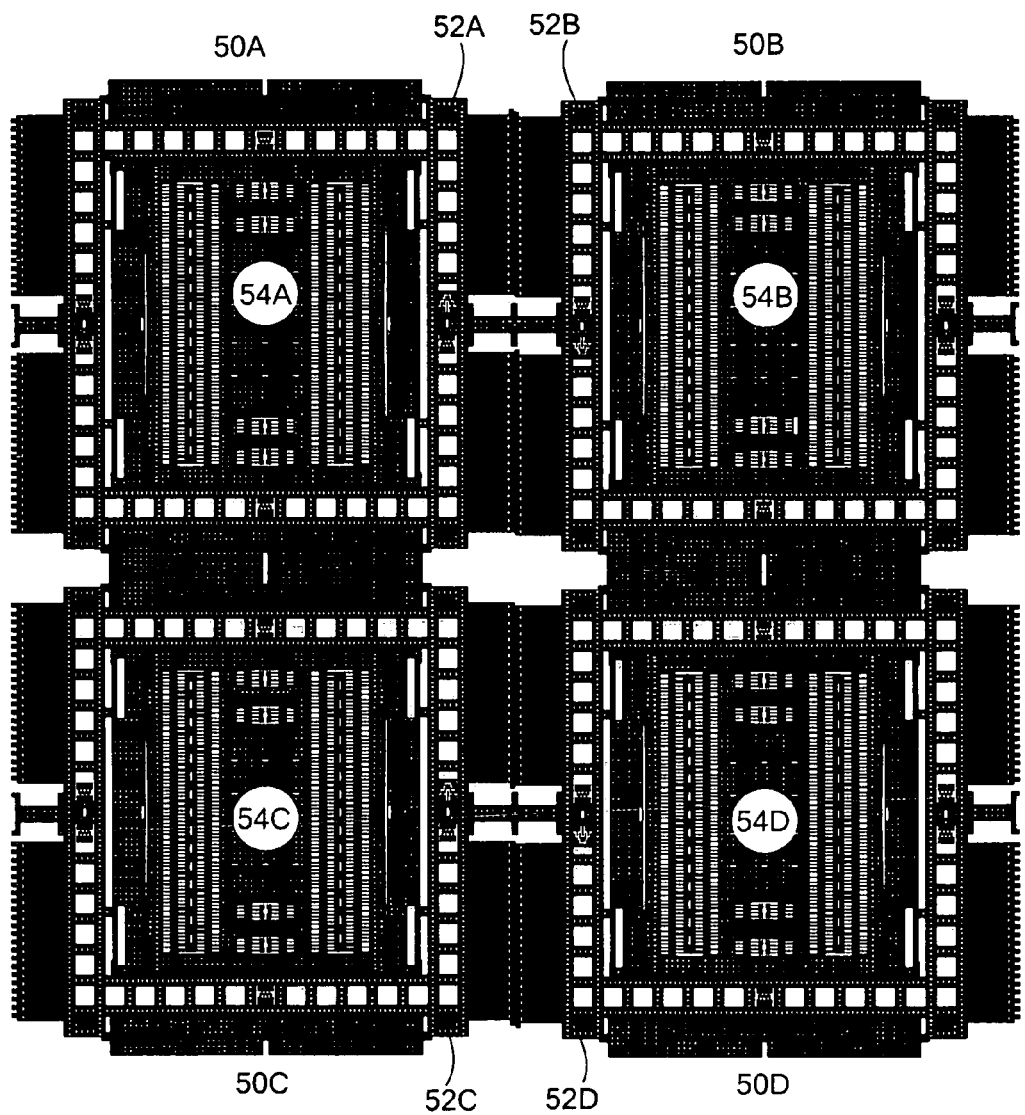
FIG. 5 shows four gyroscopes arranged in a vertically and horizontally coupled "cross-quad" configuration in accordance with a first exemplary embodiment of the present invention.
Figure 6:
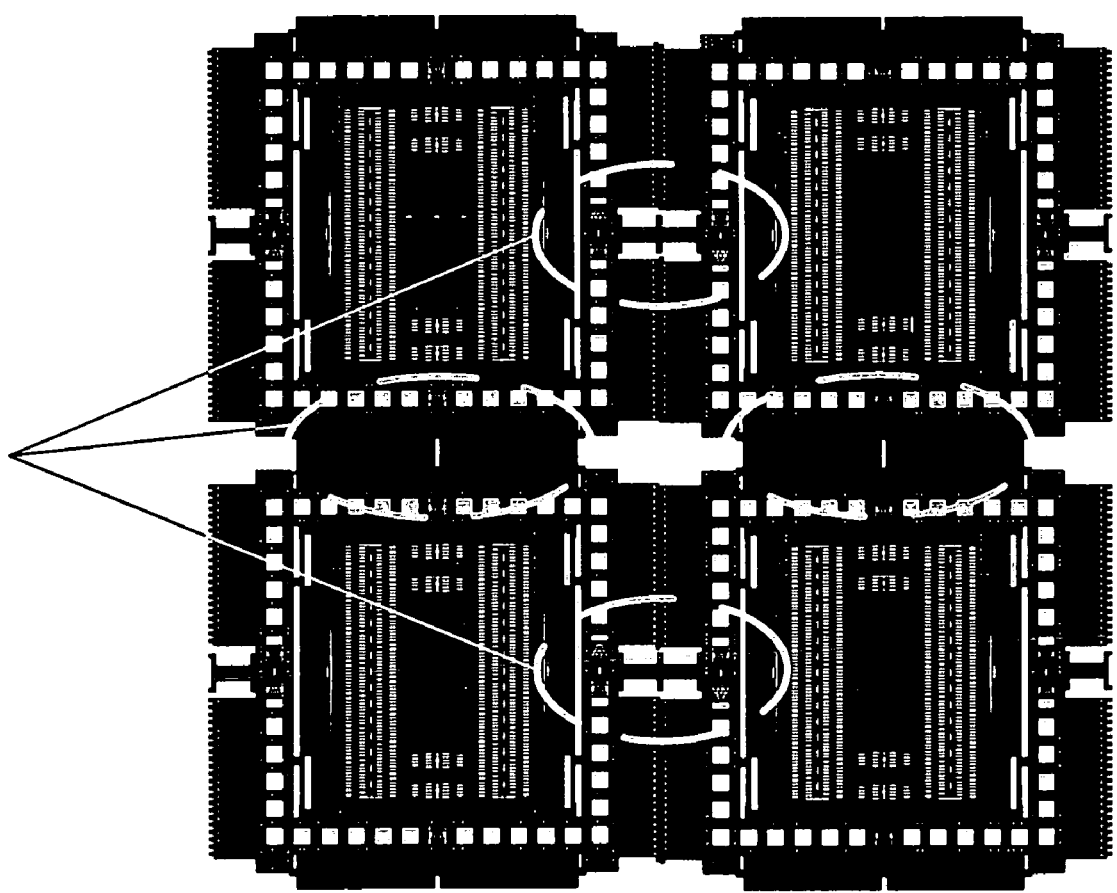
FIG. 6 shows the locations of the various couplings between the gyroscopes in accordance with the exemplary embodiment shown in FIG. 5.

FIG. 5 shows four gyroscopes arranged in a vertically and horizontally coupled "cross-quad" configuration in accordance with a first exemplary embodiment of the present invention. Specifically, the cross-quad configuration includes gyroscopes 50A, 50B, 50C, and 50D. Each gyroscope includes a frame (52A, 52B, 52C, 52D) and a resonator (54A, 54B, 54C, 54D) movably suspended within the inner periphery of the frame. The frames 52A and 52B of gyroscopes 50A and 50B are coupled substantially as described above with reference to FIG. 3, as are the frames 52C and 52C of gyroscopes 50C and 50D. Furthermore, in accordance with an exemplary embodiment of the invention, the frames 52A and 52C of gyroscopes 50A and 50C are coupled to one another, as are the frames 52B and 52D of gyroscopes 50B and 50D. FIG. 6 shows the locations of the various couplings between the gyroscopes. The couplings between gyroscopes 50A/50B and 50C/50D are described above with reference to FIGS. 2-4. The couplings between gyroscopes 50A/50C and 50B/50D are described below.

Figure 7A:
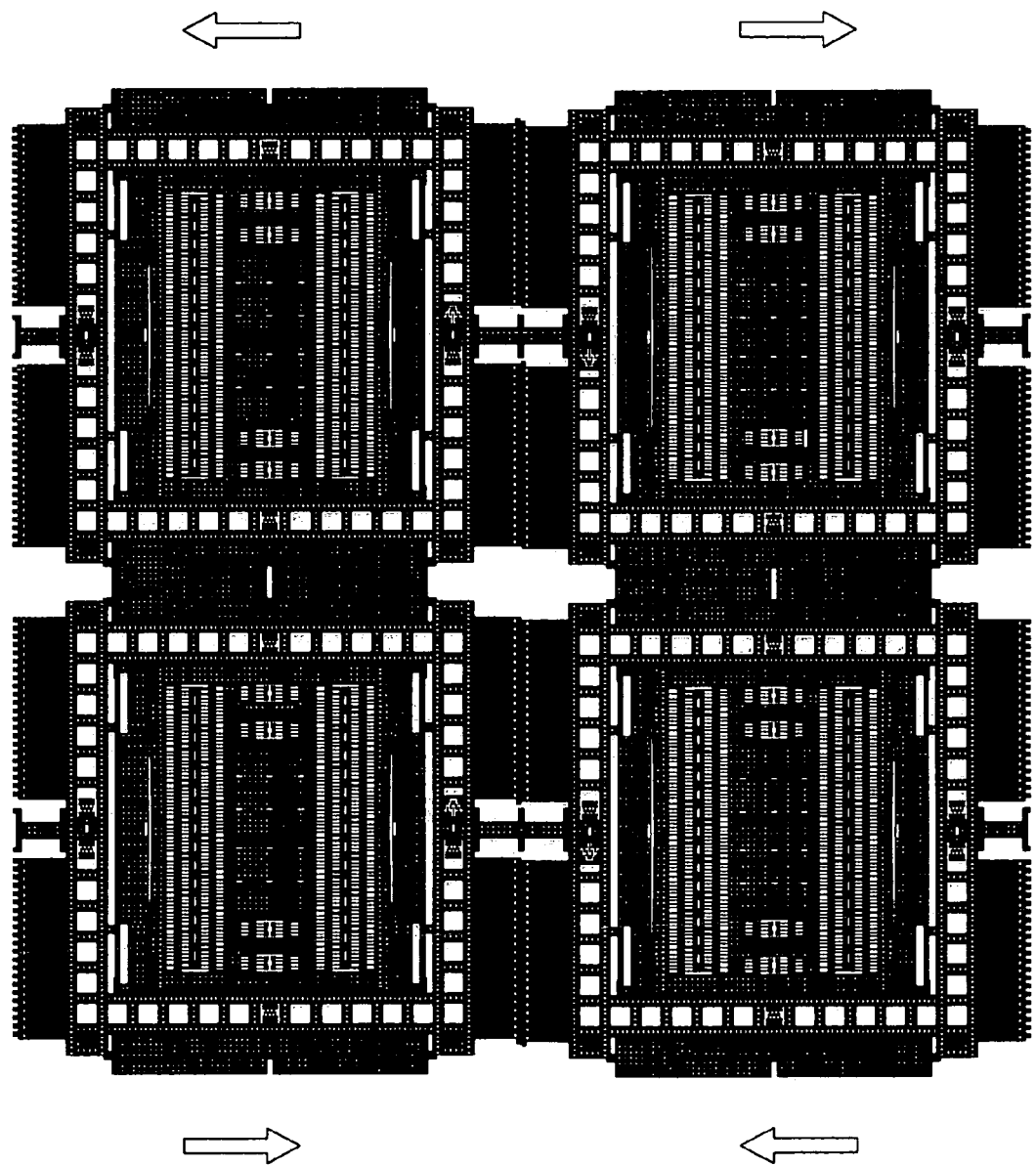
FIGS. 7A and 7B show representations of the phase and anti-phase movements of the resonators in accordance with the exemplary embodiment shown in FIG. 5.
Figure 7B:
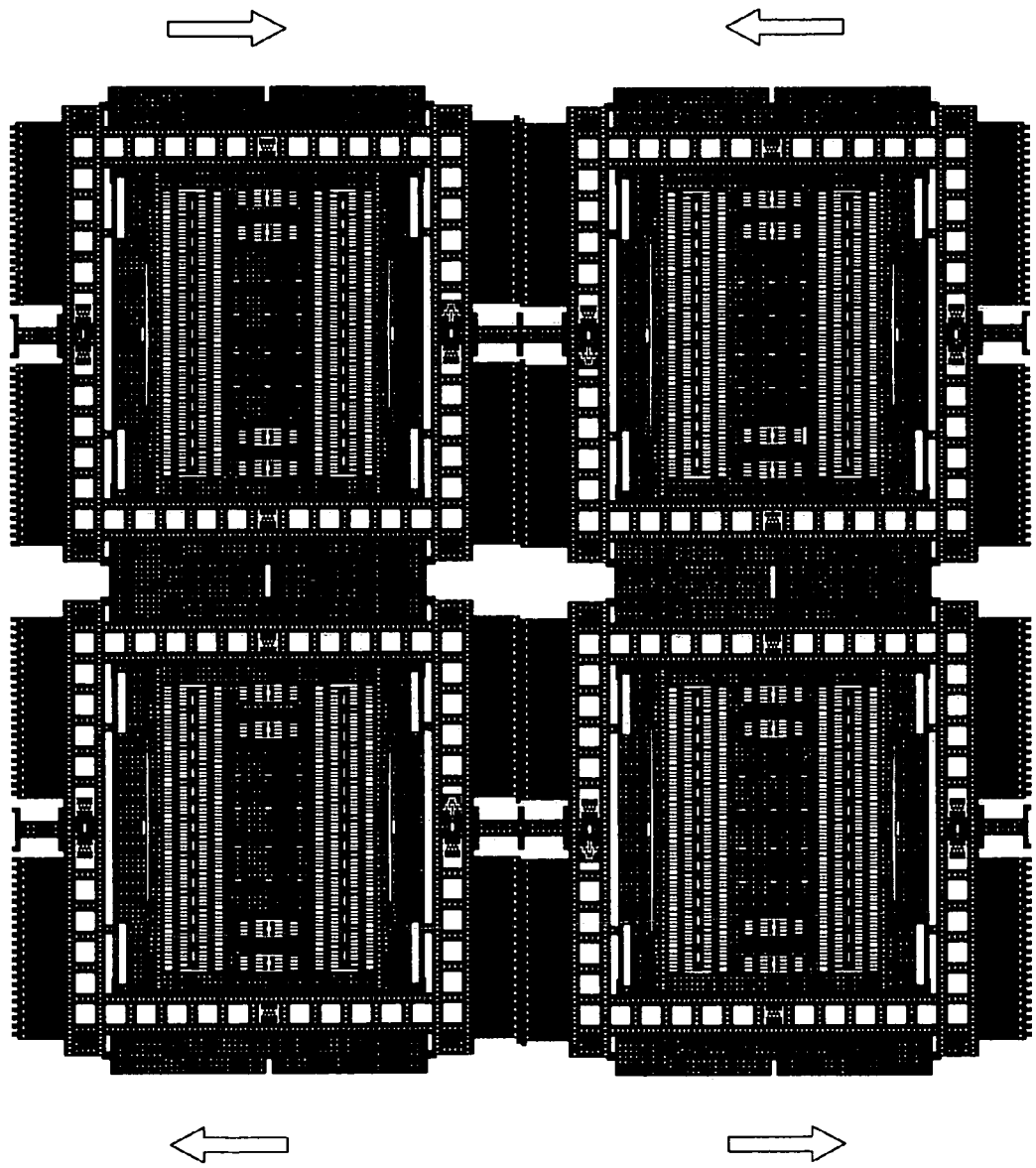

The resonators of each pair of gyroscopes 50A/50B and 50C/50D operate in anti-phase to one another. Furthermore, in an exemplary embodiment of the invention, the resonators of gyroscopes 50A and 50B operate in anti-phase to the corresponding resonators of gyroscopes 50C and 50D. Therefore, the resonators of gyroscopes that are diagonally opposite operate in phase with one another, while the resonators of any pair of adjacent gyroscopes operate in anti-phase with one another. FIGS. 7A and 7B show representations of the phase and anti-phase movements of the resonators in accordance with this exemplary embodiment of the invention.

Also, the frames of each pair of gyroscopes 50A/50B and 50C/50D are coupled to allow movement in opposite directions but substantially restrict movement in the same direction. Furthermore, in accordance with an exemplary embodiment of the invention, the frames of gyroscopes 50A and 50C are coupled to allow movement in opposite directions but substantially restrict movement in the same direction, as are frames of gyroscopes 50B and 50D. The frames of gyroscopes 50A/50C move in anti-phase to the frames of gyroscopes 50B/50D. Therefore, the frames of gyroscopes that are diagonally opposite operate in phase with one another, while the frames of any pair of adjacent gyroscopes operate in anti-phase with one another.

Figure 8A:
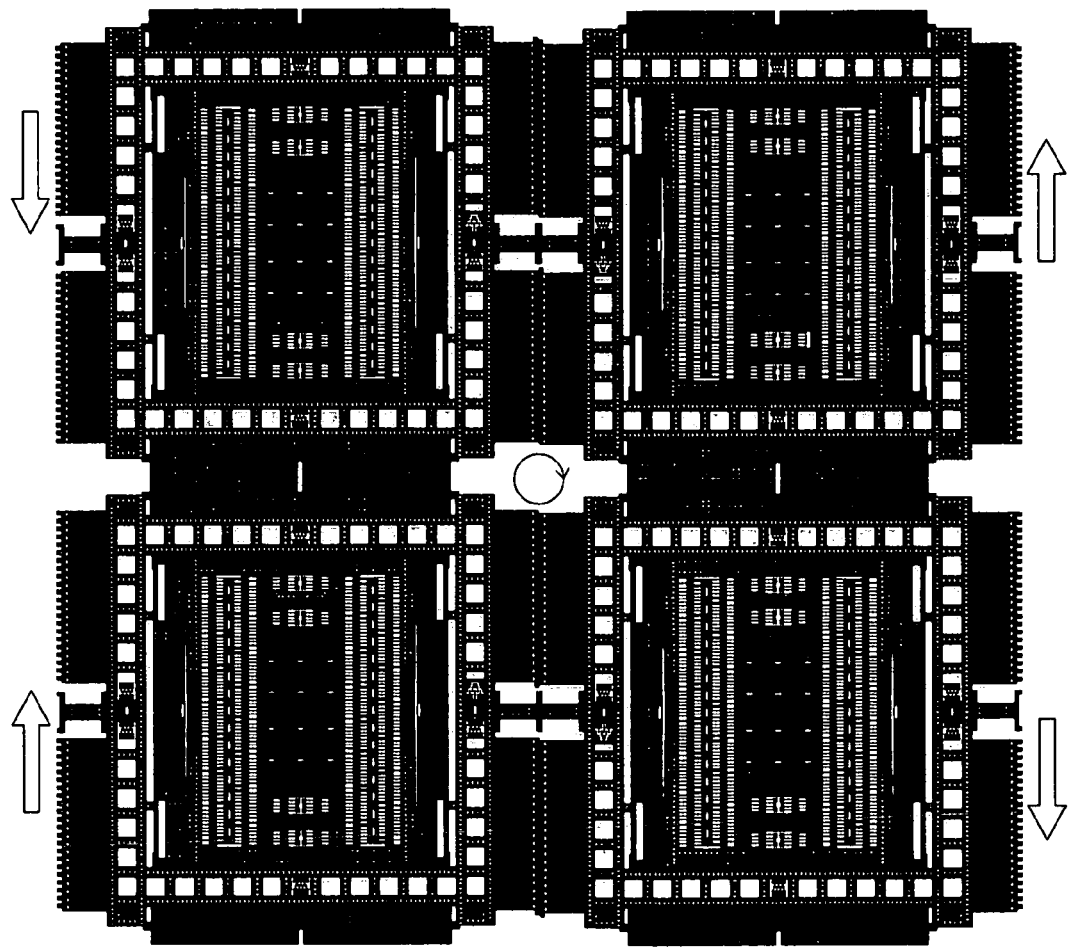
FIGS. 8A and 8B show representations of the movements of the gyroscope frames when the inertial sensor is rotated about the Z-axis in accordance with the exemplary embodiment shown in FIG. 5.
Figure 8B:
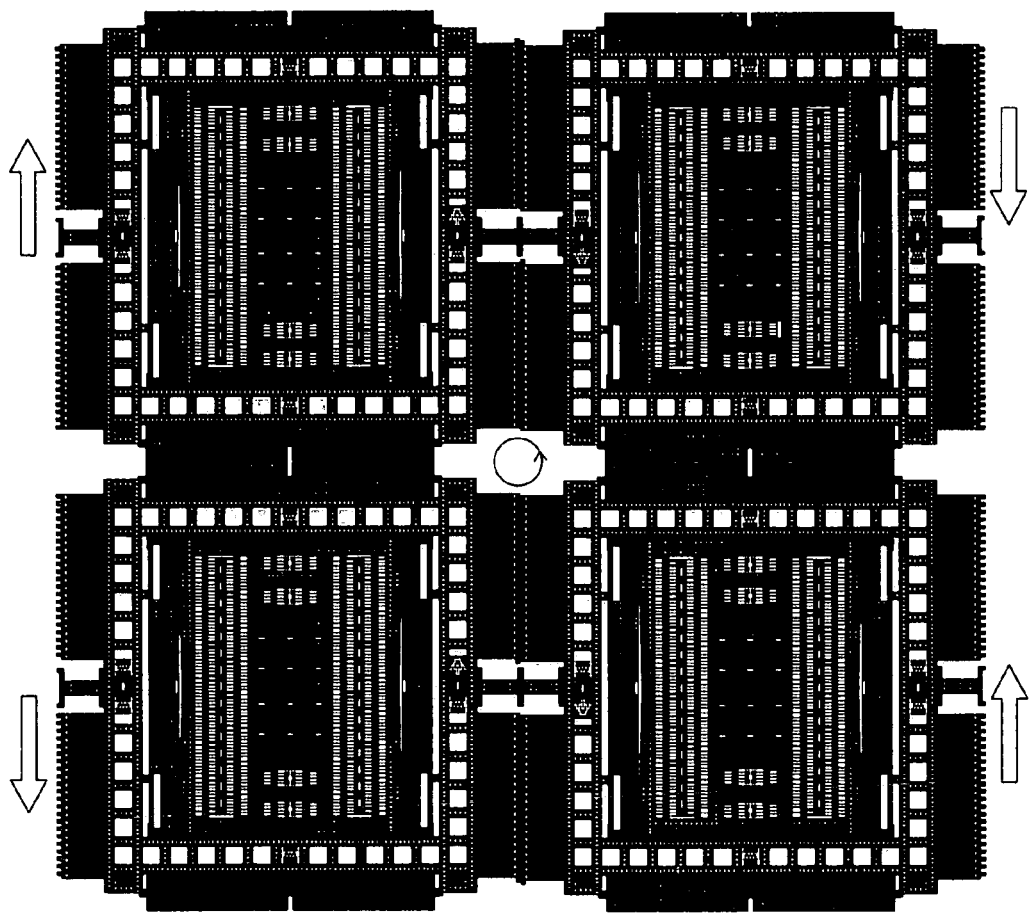

As discussed above, the resonators are caused to resonate back and forth in the X-axis. Rotation of the inertial sensor about the Z-axis causes displacement of the frames in the Y-axis. FIG. 8A shows representations of the movements of the gyroscope frames relative to the substrate(s) when the gyroscope is rotated clockwise about the Z-axis and the resonators are moving as shown in FIG. 7A. In this case, frames 52A and 52C of gyroscopes 50A and 50C move toward one another, while frames 52B and 52D of gyroscopes 50B and 50D move away from one another. FIG. 8B shows representations of the movements of the gyroscope frames relative to the substrate(s) when the gyroscope is rotated counterclockwise about the Z-axis and the resonators are moving as shown in FIG. 7A. In this case, frames 52A and 52C of gyroscopes 50A and 50C move away from one another, while frames 52B and 52D of gyroscopes 50B and 50D move toward one another. It should be noted that the movements of the frames would be opposite when the resonators are moving as shown in FIG. 7B.

As discussed above, frames 52A and 52C of gyroscopes 50A and 50C are vertically coupled, as are frames 52B and 52D of gyroscopes 50B and 50D. In an exemplary embodiment of the invention, the pairs of frames are vertically coupled by various levers and flexures that allow the desired co-linear anti-phase movements of the frames but substantially restrict in phase movements of the frames.

Figure 9A:
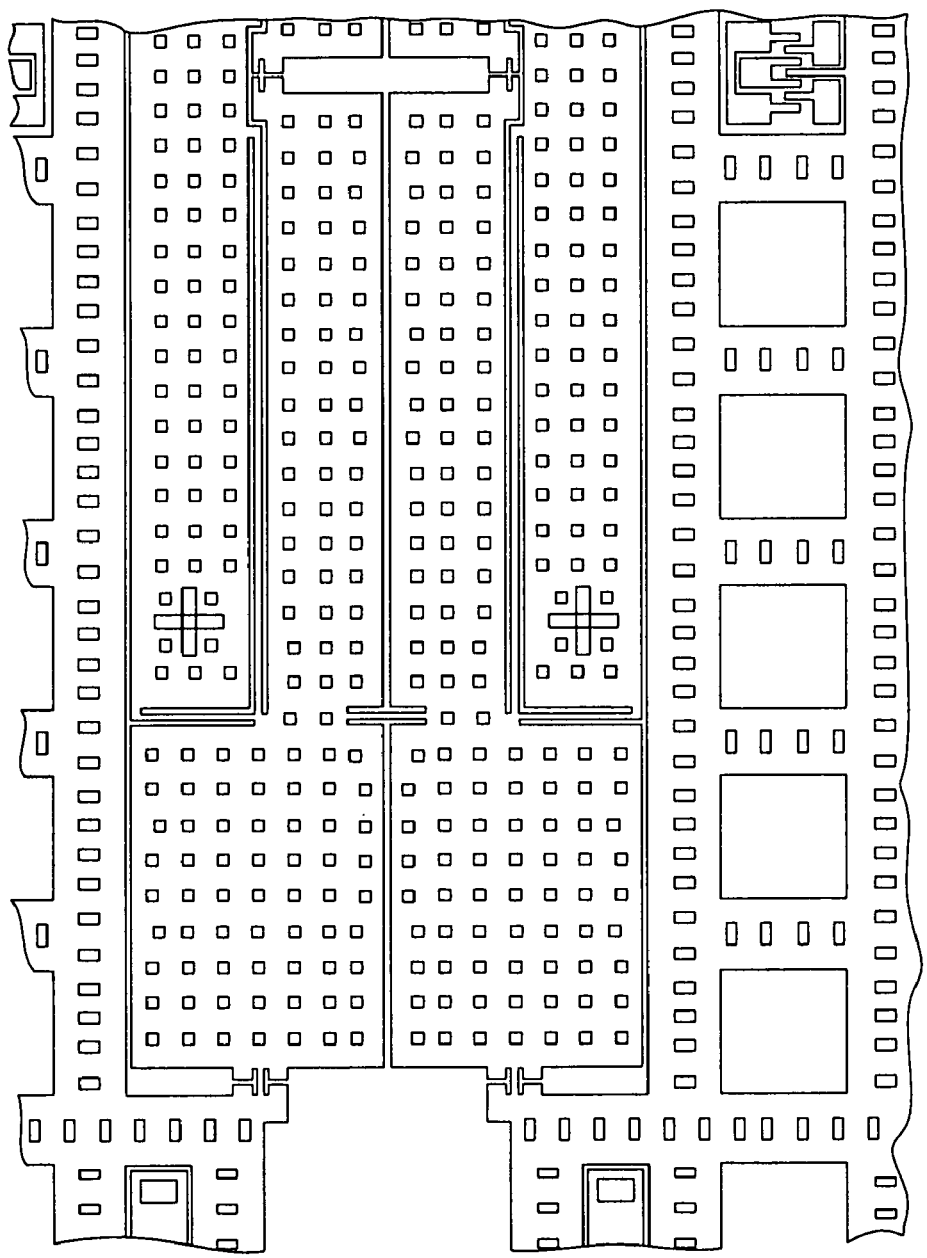
FIG. 9A shows a portion of a vertical coupling between two gyroscopes in accordance with the first exemplary embodiment of the invention shown in FIG. 5.
Figure 9B:
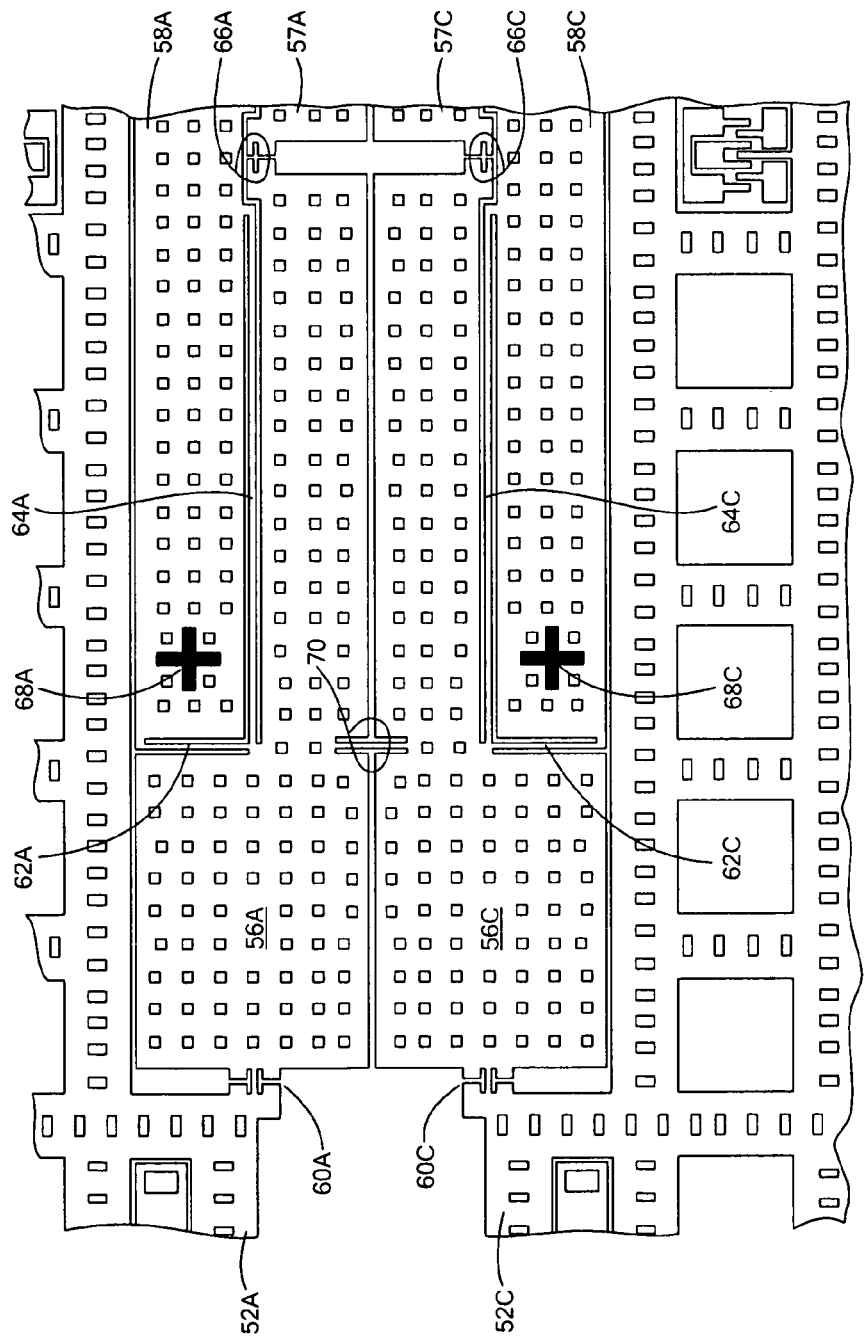
FIG. 9B shows the same portion as in FIG. 9A with relevant features marked.
Figure 10A:
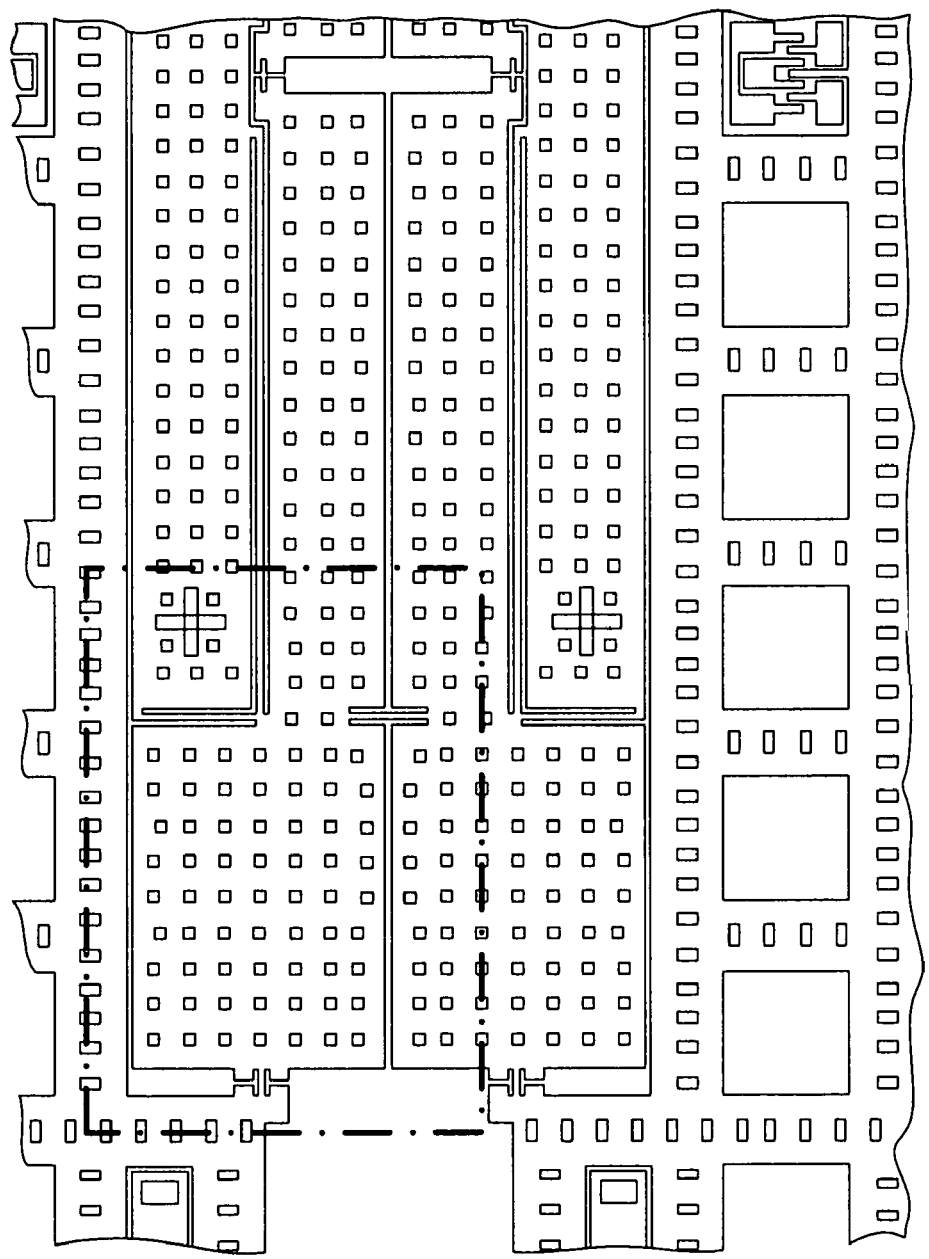
FIG. 10A shows a highlighted section of the portion of the interconnection shown in FIG. 9A.
Figure 10B:
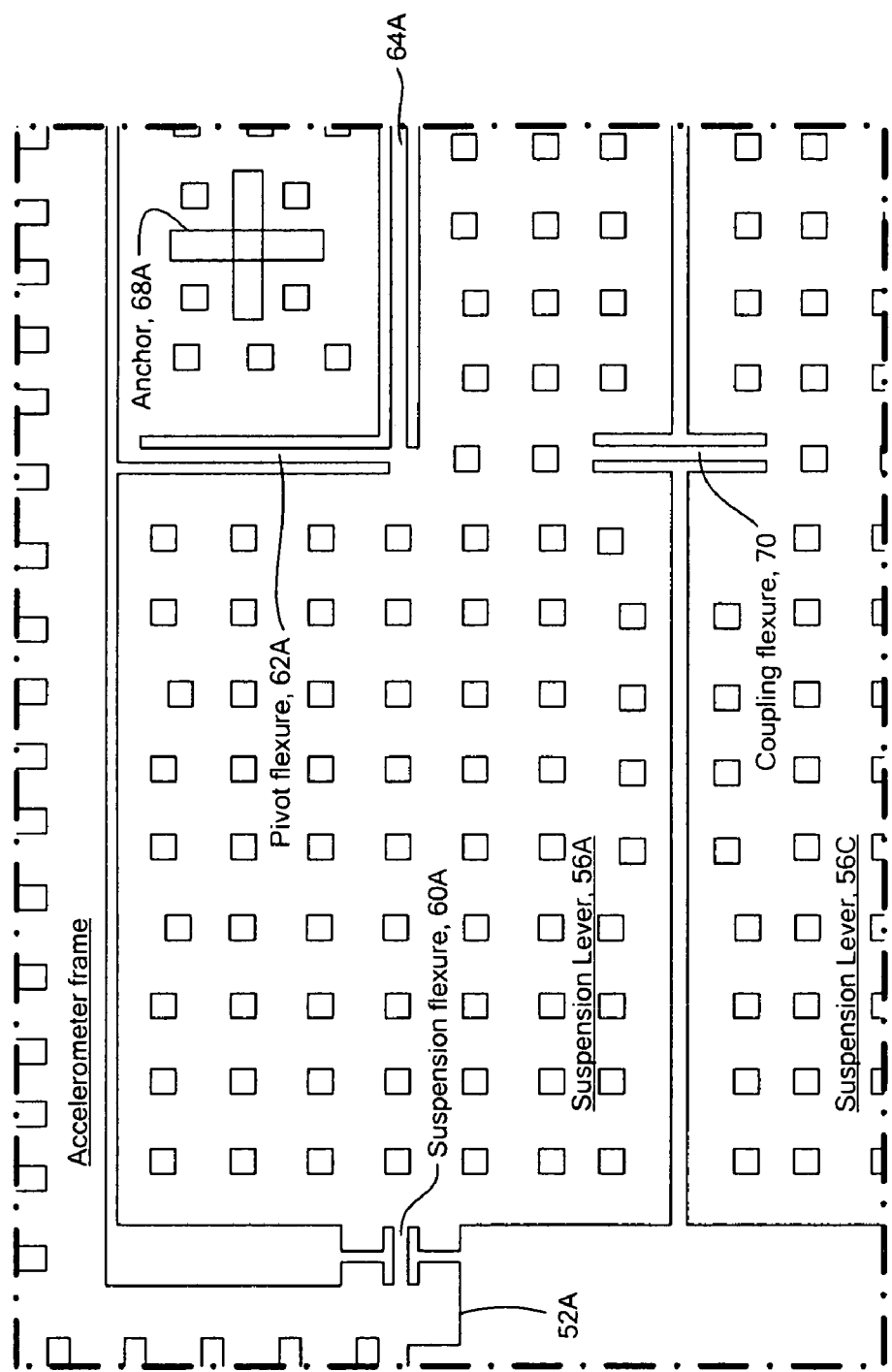
FIG. 10B shows an enlarged view of the section highlighted in FIG. 10A.

FIG. 9A shows a portion of the interconnection between gyroscopes 50A and 50C. FIG. 9B shows the same portion as in FIG. 9A with relevant features marked. For convenience, only about half of the interconnection features are shown (with the remaining interconnection features substantially a mirror image, along a line through lever flexures 66A and 66C, of those shown). Among other things, the interconnection includes levers 56A and 56C, levers 57A and 57C (which are substantially mirror images of levers 56A and 56C), and bars 58A and 58C. Levers 56A and 56C are coupled respectively to frames 52A and 52C by suspension flexures 60A and 60C, to levers 57A and 57C by lever flexures 66A and 66C, and to levers 58A and 58C by pivot flexures 62A, 64A, 62C, and 64C. The levers 56A and 56C are also interconnected by coupling flexure 70. The bars 58A and 58C are anchored to the substrate respectively by anchors 68A and 68C. It should be noted that, due to the mirror image nature of this exemplary interconnection, the interconnection includes substantially identical anchors, levers, and flexures on the other side of the interconnection. FIG. 10A shows a highlighted section of the portion of the interconnection shown in FIG. 9A. FIG. 10B shows an enlarged view of the section highlighted in FIG. 10A.

It should be noted that the pivot points of the suspensions 62A and 62C are aligned such that they lie directly opposite each other, and the coupling flexure 70 is embedded in the levers 56A and 56C between the pivot points. When the frames move in anti-phase to one another, both ends of the coupling flexure 70 move transversely to the movement of the frames in the same direction by substantially the same amount. Therefore, the coupling flexure 70 only needs to bend by a very small amount to accommodate the motion. Thus, the coupling flexure contributes little to the stiffness of the desired motion.

For example, with reference again to FIG. 9B, when frames 52A and 52C are moving away from one another, suspension flexures 60A and 60C are pulled away from one another, causing the ends of levers 56A and 56C near suspension flexures 60A and 60C to be pulled away from one another and causing the opposite ends of levers 56A and 56C to move toward one another. Pivot flexures 62A and 64A allow lever 56A to pivot with respect to bar 58A, while pivot flexures 62C and 64C allow lever 56C to pivot with respect to bar 58C. Coupling flexure 70 is positioned substantially at the pivot point of the levers 56A and 56C and allows the levers 56A and 56C to pivot with respect to one another. At the same time, levers 57A and 57C are moving in a mirror image with respect to levers 56A and 56C such that pivot flexures 66A and 66C are moving toward one another. Lever flexure 66A allows the levers 56A and 57A to pivot with respect to one another, while lever flexure 66C allows the levers 56C and 57C to pivot with respect to one another.

When frames 52A and 52C are moving toward one another, suspension flexures 60A and 60C are pushed toward one another, causing the ends of levers 56A and 56C near suspension flexures 60A and 60C to be pushed toward one another and causing the opposite ends of levers 56A and 56C to move away from another. Pivot flexures 62A and 64A allow lever 56A to pivot with respect to bar 58A, while pivot flexures 62C and 64C allow lever 56C to pivot with respect to bar 58C. Coupling flexure 70 allows the levers 56A and 56C to pivot with respect to one another. At the same time, levers 57A and 57C are moving in a mirror image with respect to levers 56A and 56C such that pivot flexures 66A and 66C are moving away from another. Pivot flexure 66A allows the levers 56A and 57A to pivot with respect to one another, while pivot flexure 66C allows the levers 56C and 57C to pivot with respect to one another.

On the other hand, if the frames are urged to move in the same direction, then the ends of the coupling flexure 70 are correspondingly urged to move in opposite directions. The coupling flexure 70 strongly resists such movement in opposite directions, discriminating instead in favor of the desired cross-quad motion. Thus, the interconnection permits the desired anti-phase movement of the frames but substantially prevents in-phase movement of the frames.

Figure 11:
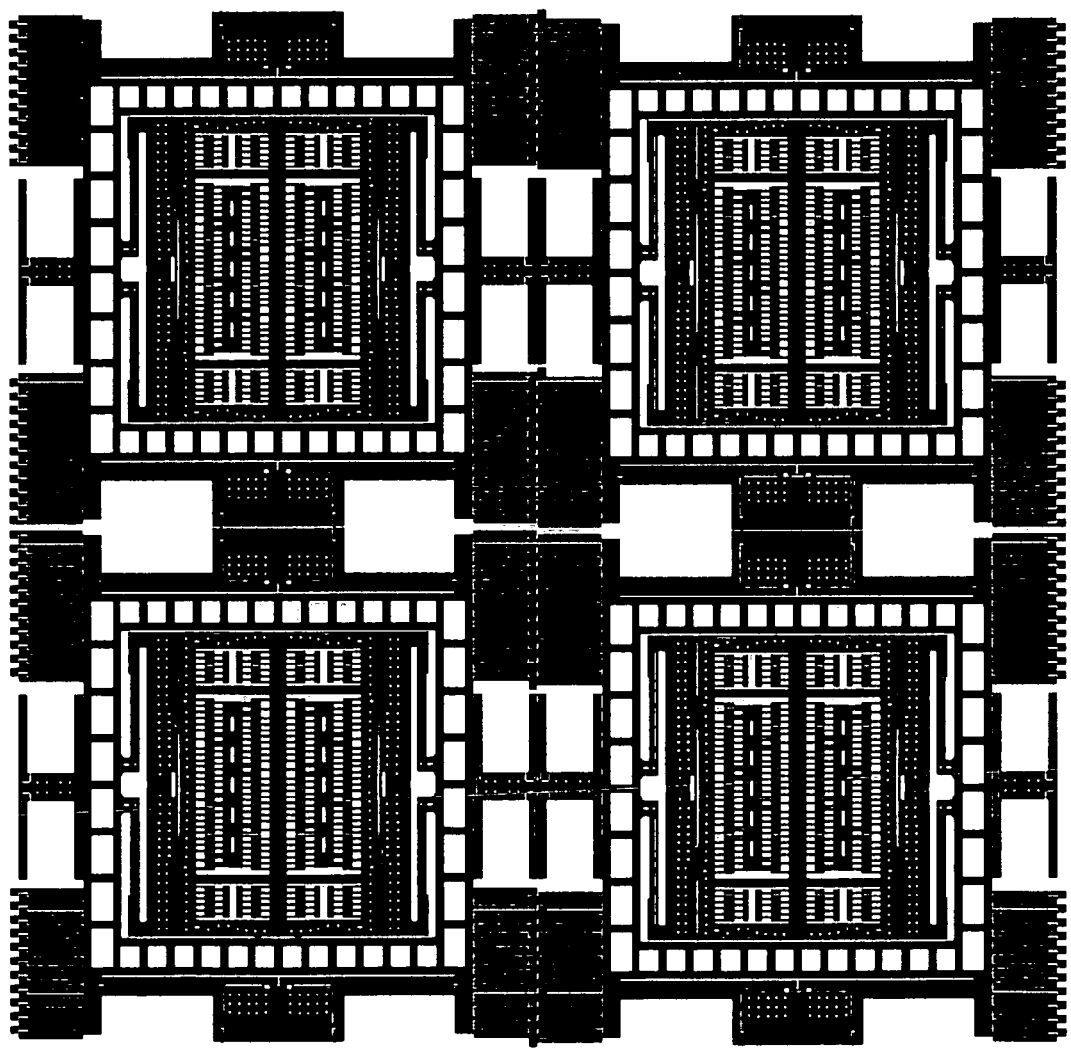
FIG. 11 shows four gyroscopes arranged in a "cross-quad" configuration in accordance with a second exemplary embodiment of the present invention.

In an alternative embodiment, shown in FIG. 11, the pivot flexure directions are reversed from that shown in FIGS. 9 and 10 and the distance between the coupling flexure and the suspension pivot points is increased. Among other things, this allows lower overall stiffness of the desired motion (which is useful for making smaller structures). Also, by increasing the distance between the coupling flexure and the suspension pivot point, the interconnection discriminates even more against in-phase movement of the frames.

Figure 12A:
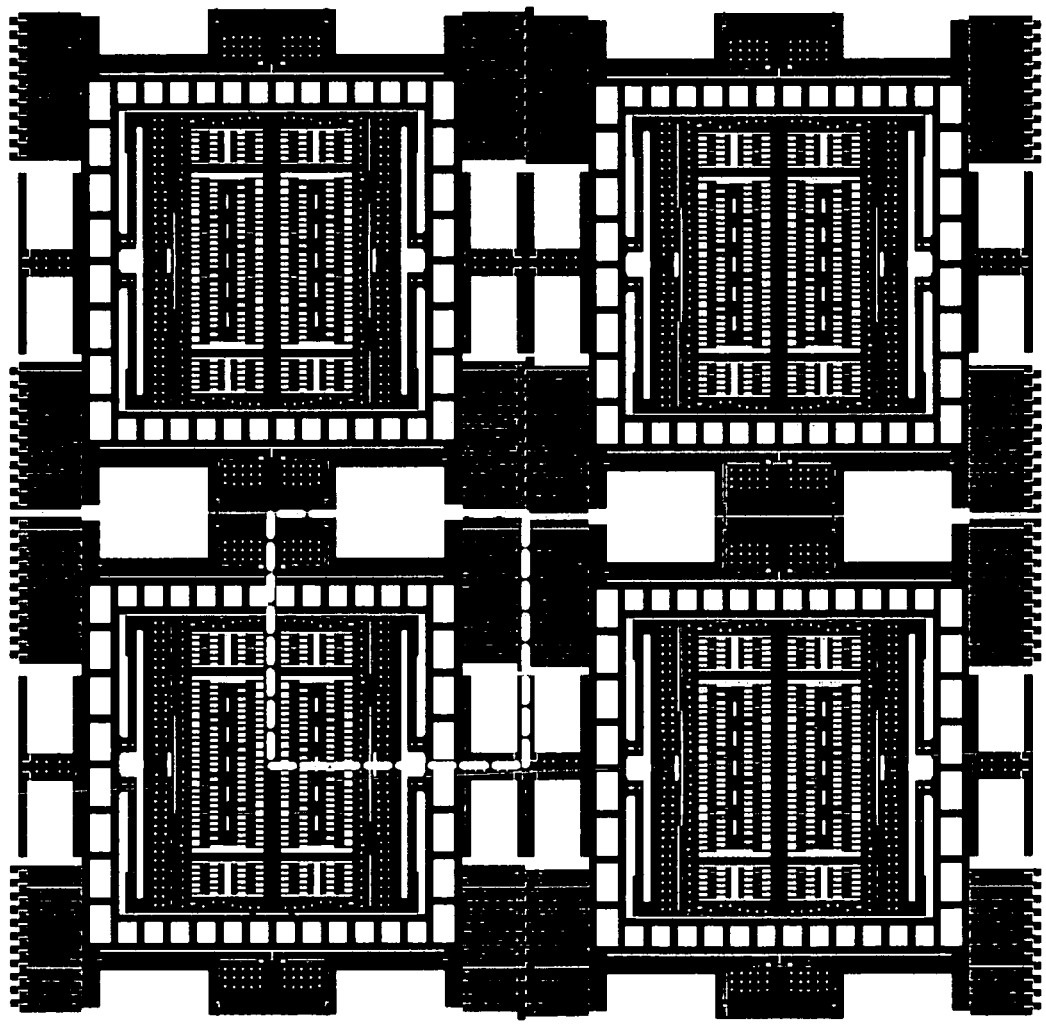
FIG. 12A shows a highlighted section of the cross-quad configuration shown in FIG. 11.
Figure 12B:
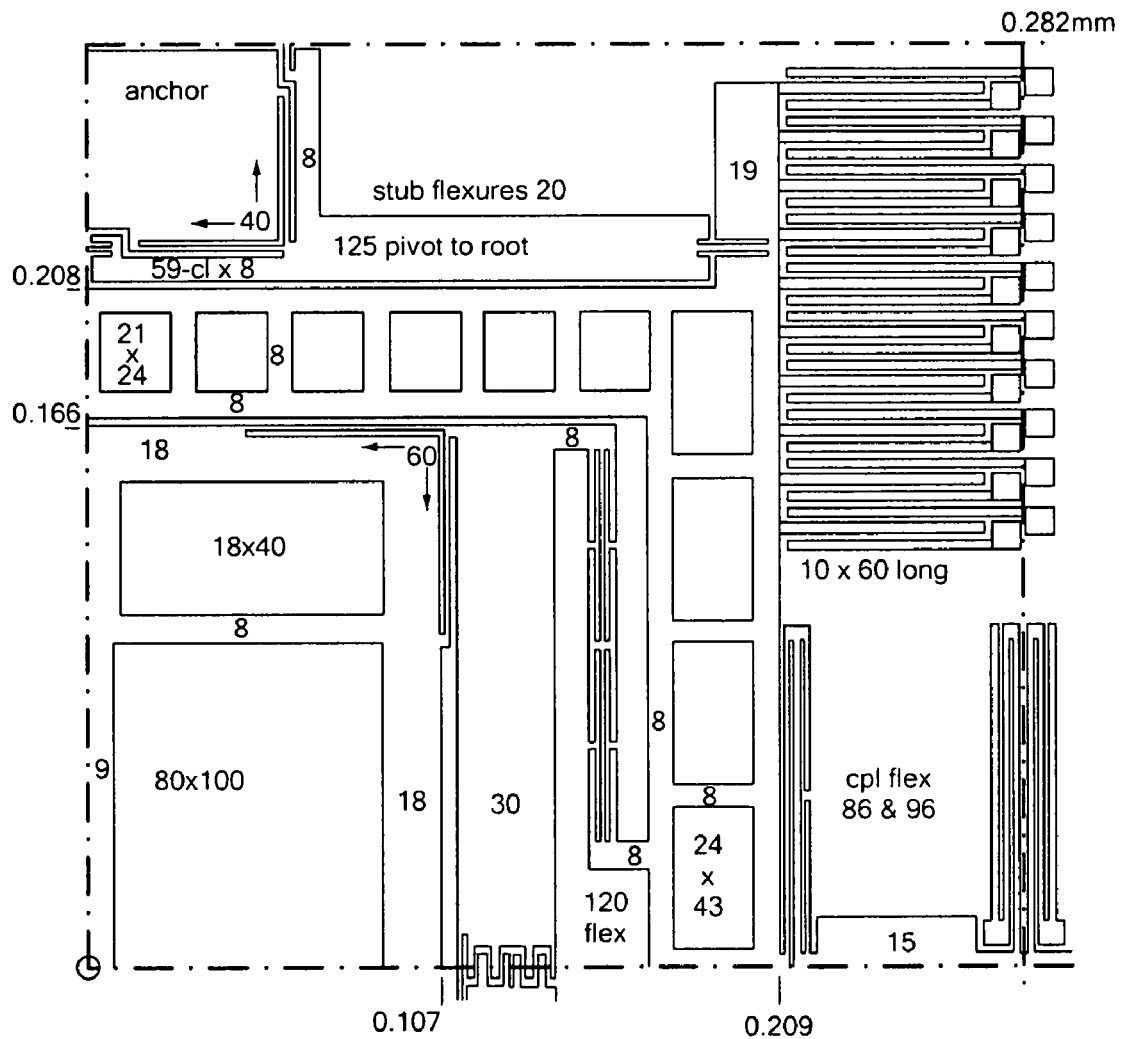
FIG. 12B shows an enlarged view of the section highlighted in FIG. 12A.
Figure 12C:
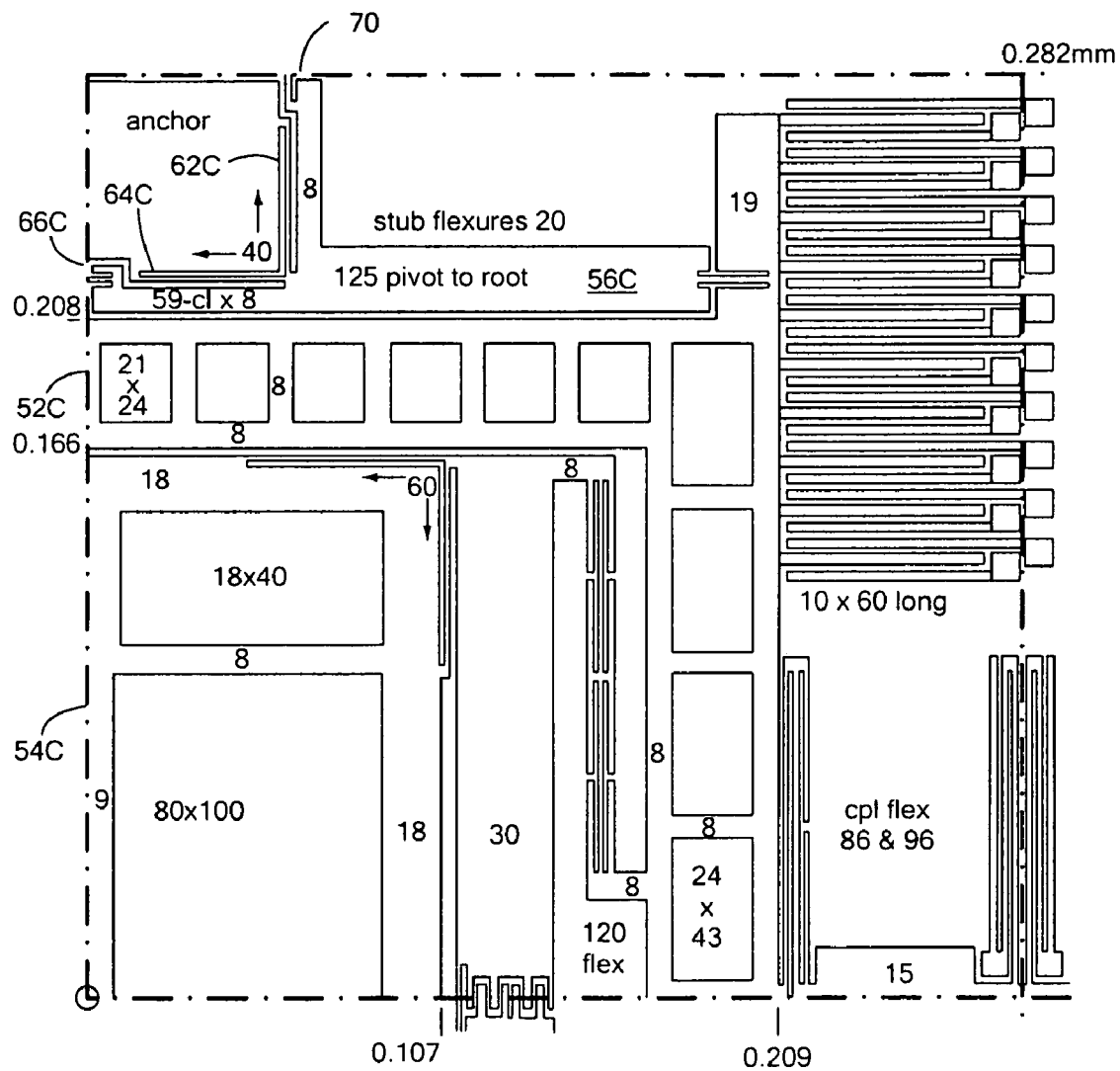
FIG. 12C shows the same portion as in FIG. 12B with relevant features marked.

FIG. 11 shows four gyroscopes arranged in a "cross-quad" configuration in accordance with a second exemplary embodiment of the present invention. FIG. 12A shows a highlighted section of the cross-quad configuration shown in FIG. 11. FIG. 12B shows an enlarged view of the section highlighted in FIG. 12A. FIG. 12C shows the same portion as in FIG. 12B with relevant features marked. As shown in FIG. 12C, the directions of pivot flexures 62C and 64C are reversed from pivot flexures shown in FIGS. 9 and 10. The intersection point of the pivot flexures 62C and 64C is near the edge of the lever 56C nearest the frame 56C rather than toward the middle of the lever, as is the case in FIGS. 9 and 10. Frame 52C, resonator 54C, lever flexure 66C, and coupling flexure 70 are shown for reference. In this configuration, the distance between the coupling flexure and the intersection points of the pivot flexures is increased so as to discriminate even more against in-phase movement of the frames.

It should be noted that the exemplary vertical couplings described above with reference to FIGS. 9-12 could be used in a vertically coupled cross-quad gyroscope configuration as shown in FIG. 1B.

It should also be noted that certain features and advantages of the present invention may be realized with a single pair of vertically coupled gyroscopes (e.g., just the left side or right side pair of gyroscopes coupled as shown in FIG. 1B). Thus, it is within the scope of the present invention to have an inertial sensor with a single pair of vertically coupled gyroscopes.

In illustrative embodiments, the gyroscopes are run at about 17 volts.

The present invention may be embodied in other specific forms without departing from the true scope of the invention. The described embodiments are to be considered in all respects only as illustrative and not restrictive.

What is claimed is:

1. An inertial sensor comprising:
    at least one substrate; and
    four sensor elements arranged in a cross-quad configuration substantially in a plane above the at least one substrate, the four sensor elements including:
        a first sensor element having a first resonator suspended within a first frame;
        a second sensor element having a second resonator suspended within a second frame;
        a third sensor element having a third resonator suspended within a third frame; and
        a fourth sensor element having a fourth resonator suspended within a fourth frame, wherein the first and third frames are configured to move co-linearly along a first axis in the plane, the second and fourth frames are configured to move co-linearly along a second axis in the plane parallel to the first axis, and the frames of at least two pairs of adjacent sensor elements are interconnected by couplings that enable anti-phase movements of the frames but substantially prevent in-phase movements of the frames.

2. An inertial sensor according to claim 1, wherein:
the first and second resonators are caused to move co-linearly and in anti-phase to one another along a third axis normal to the first and second axes in the plane;
the third and fourth resonators are caused to move co-linearly and in anti-phase to one another along a fourth axis parallel to the third axis in the plane;
the first and third resonators are caused to move in anti-phase to one another; and
the second and fourth resonators are caused to move in anti-phase to one another.

3. An inertial sensor according to claim 1, wherein rotation of the at least one substrate about an axis normal to the plane causes the movements of the frames.

4. An inertial sensor according to claim 3, wherein:
rotation of the substrate in a first direction causes the first and third frames to move toward one another and the second and fourth frames to move away from one another while the first and second resonators move toward each other; and
rotation of the substrate in a second direction causes the first and third frames to move away from one anther and the second and fourth frames to move toward one another while the first and second resonators move toward each other.

5. An inertial sensor according to claim 1, wherein:
the first and second frames are interconnected by a first horizontal coupling that enables anti-phase movements of the frames along the frame's respective axes but substantially prevents in-phase movements of the frames; and
the third and fourth frames are interconnected by a second horizontal coupling that enables anti-phase movements of the frames along the frame's respective axes but substantially prevents in-phase movements of the frames.

6. An inertial sensor according to claim 5, wherein each of the first and second horizontal couplings comprises:
at least one bar coupled between the first and second frames, the at least one bar supported by structures anchored to the at least one substrate, the structures allowing the at least one bar to rotate at a pivot point when the frames move in anti-phase to one another but substantially preventing in-phase movements of the frames.

7. An inertial sensor according to claim 6, wherein each of the first and second horizontal couplings includes:
a first pair of short flexures extending from one of the frames and interconnected by a first long flexure;
a second pair of short flexures extending from the other of the frames and interconnected by a second long flexure;
a bar coupling the first long flexure to the second long flexure substantially at the midpoints of the first and second long flexures; and
an anchor flexure supporting the bar, the anchor flexure intersecting with the bar substantially at the midpoints of the bar and the anchor flexure, each end of the anchor flexure anchored to the substrate.

8. An inertial sensor according to claim 6, wherein each of the first and second horizontal couplings includes:
a first flexure extending from one of the frames;
a second flexure extending from the other of the frames;
a bar coupled between the first and second flexures; and
at least one anchor flexure supporting the bar, each of the at least one anchor flexure including a structure anchored at one end to the at least one substrate and folded back 180 degrees to meet with the bar.

9. An inertial sensor according to claim 1, wherein:
the first and third frames are interconnected by a first vertical coupling that enables anti-phase movements of the frames along the frame's co-linear axis but substantially prevents in-phase movements of the frames; and
the second and fourth frames are interconnected by a second vertical coupling that enables anti-phase movements of the frames along the frame's co-linear axis but substantially prevents in-phase movements of the frames.

10. An inertial sensor according to claim 9, wherein each of the first and second vertical couplings includes:
a first pair of interconnected levers coupled to one of the frames, the first pair of levers including a first lever and a second lever;
a second pair of interconnected levers coupled to the other of the frames, the second pair of levers including a third lever and a fourth lever;
a plurality of lever support structures allowing the levers to pivot as the frames move in anti-phase to one another;
a first coupling flexure interconnecting the first lever and the third lever substantially between the lever's respective pivot points; and
a second coupling flexure interconnecting the second lever and the fourth lever substantially between the lever's respective pivot points, wherein the coupling flexures substantially prevent in-phase movements of the frames.

11. An inertial sensor according to claim 10, wherein both ends of each coupling flexure move transversely to the movements of the frames in the same direction by substantially the same amount during anti-phase movements of the frames but are urged to move in opposite directions during in-phase movements of the frames.

12. An inertial sensor according to claim 10, wherein the plurality of lever support structures include:
at least one pivot flexure coupled at one end to a lever and at another end to a structure anchored to the substrate.

13. An inertial sensor according to claim 12, wherein the at least one pivot flexure includes a first pivot flexure and a second pivot flexure interconnected at a point.

14. An inertial sensor according to claim 13, wherein the interconnection point is toward a middle of the lever.

15. An inertial sensor according to claim 13, wherein the interconnection point is toward an edge of the lever nearest the frame.

16. An inertial sensor according to claim 13, wherein:
the first coupling flexure is substantially in line with the interconnection points of the first and third levers; and
the second coupling flexure is substantially in line with the interconnection points of the second and fourth levers.

17. An inertial sensor according to claim 12, wherein the structure anchored to the substrate is a bar anchored to the substrate.

18. An inertial sensor according to claim 10, wherein each pair of levers is interconnected by a lever flexure.

19. An inertial sensor according to claim 10, wherein each lever is connected to the lever's respective frame by a suspension flexure.

20. An inertial sensor according to claim 1, wherein each frame includes finger structures that interdigitate with fixed sensing fingers anchored to the at least one substrate for electrostatically sensing the movements of the frames.

21. An inertial sensor according to claim 1, wherein each resonator includes finger structures that interdigitate with fixed drive fingers anchored to the at least one substrate for electrostatically moving the resonator.

22. An inertial sensor according to claim 1, wherein:
the first and second frames are interconnected by a first horizontal coupling that enables anti-phase movements of the frames along the frame's respective axes but substantially prevents in-phase movements of the frames;
the third and fourth frames are interconnected by a second horizontal coupling that enables anti-phase movements of the frames along the frame's respective axes but substantially prevents in-phase movements of the frames;
the first and third frames are interconnected by a first vertical coupling that enables anti-phase movements of the frames along the frame's co-linear axis but substantially prevents in-phase movements of the frames; and
the second and fourth frames are interconnected by a second vertical coupling that enables anti-phase movements of the frames along the frame's co-linear axis but substantially prevents in-phase movements of the frames.

23. An inertial sensor comprising:
at least one substrate; and
four sensor elements arranged in a cross-quad configuration substantially in a plane above the at least one substrate, the four sensor elements including:
a first sensor element having a first resonator suspended within a first frame;
a second sensor element having a second resonator suspended within a second frame;
a third sensor element having a third resonator suspended within a third frame; and
a fourth sensor element having a fourth resonator suspended within a fourth frame, wherein the first and third frames are configured to move co-linearly along a first axis in the plane and the second and fourth frames are configured to move co-linearly along a second axis in the plane parallel to the first axis;
first means for interconnecting the frames of a first pair of adjacent sensor elements to enable anti-phase movements of the frames but substantially prevent in-phase movements of the frames; and
second means for interconnecting the frames of a second pair of adjacent sensor elements to enable anti-phase movements of the frames but substantially prevent in-phase movements of the frames.

24. An inertial sensor according to claim 23, further comprising:
third means for interconnecting the frames of a third pair of adjacent sensor elements to enable anti-phase movements of the frames but substantially prevent in-phase movements of the frames; and
fourth means for interconnecting the frames of a fourth pair of adjacent sensor elements to enable anti-phase movements of the frames but substantially prevent in-phase movements of the frames.

25. An inertial sensor comprising:
at least one substrate;
a pair of sensor elements substantially in a plane above the at least one substrate, each sensor element having a resonator suspended within a frame, the frames configured to move co-linearly along an axis in the plane; and
a vertical coupling, interconnecting the frames, that enables anti-phase movements of the frames along the frame's co-linear axis but substantially prevents in-phase movements of the frames.

26. An inertial sensor according to claim 25, wherein the vertical coupling includes:
a first pair of interconnected levers coupled to one of the frames, the first pair of levers including a first lever and a second lever;
a second pair of interconnected levers coupled to the other of the frames, the second pair of levers including a third lever and a fourth lever;
a plurality of lever support structures allowing the levers to pivot as the frames move in anti-phase to one another;
a first coupling flexure interconnecting the first lever and the third lever substantially at the lever's respective pivot points; and
a second coupling flexure interconnecting the second lever and the fourth lever substantially at the lever's respective pivot points, wherein the coupling flexures substantially prevent in-phase movements of the frames.

* * * * *

UNITED STATES PATENT AND TRADEMARK OFFICE
CERTIFICATE OF CORRECTION

PATENT NO.         : 7,421,897 B2
APPLICATION NO.    : 11/106053
DATED              : September 9, 2008
INVENTOR(S)        : John A. Geen et al.

It is certified that error appears in the above-identified patent and that said Letters Patent is hereby corrected as shown below:

In Col. 11, line 31
replace "frame's"
with --frames'--

In Col. 11, line 36
replace "frame's"
with --frames'--

In Col. 12, line 6
replace "frame's"
with --frames'--

In Col. 12, line 10
replace "frame's"
with --frames'--

In Col. 12, line 24
replace "lever's"
with --levers'--

In Col. 12, line 27
replace "lever's"
with --levers'--

In Col. 13, line 6
replace "frame's"
with --frames'--

In Col. 13, line 10
replace "frame's"
with --frames'--

In Col. 13, line 14
replace "frame's"
with --frames'--

In Col. 13, line 18
replace "frame's"
with --frames'--

UNITED STATES PATENT AND TRADEMARK OFFICE
CERTIFICATE OF CORRECTION

PATENT NO. : 7,421,897 B2
APPLICATION NO. : 11/106053
DATED : September 9, 2008
INVENTOR(S) : John A. Geen et al.

It is certified that error appears in the above-identified patent and that said Letters Patent is hereby corrected as shown below:

In Col. 14, line 23
replace "frame's"
with --frames'--

In Col. 14, line 36
replace "lever's"
with --levers'--

In Col. 14, line 39
replace "lever's"
with --levers'--

Signed and Sealed this

Twenty-fifth Day of November, 2008

JON W. DUDAS
*Director of the United States Patent and Trademark Office*